(12) United States Patent
Ishizuka et al.

(10) Patent No.: US 7,436,602 B2
(45) Date of Patent: Oct. 14, 2008

(54) LENS BARREL

(75) Inventors: Kazunori Ishizuka, Kanagawa (JP);
Toshiharu Suzuki, Saitama (JP);
Shinsuke Shoji, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 11/753,105

(22) Filed: May 24, 2007

(65) Prior Publication Data
US 2007/0273982 A1 Nov. 29, 2007

(30) Foreign Application Priority Data
May 25, 2006 (JP) ............................. 2006-145607

(51) Int. Cl.
*G02B 15/14* (2006.01)
*G02B 7/02* (2006.01)
(52) U.S. Cl. ..................... 359/700; 359/699; 359/694; 359/819; 359/823
(58) Field of Classification Search ......... 359/694–704, 359/819, 823, 826; 369/72–76, 79, 85, 137, 369/139, 349, 448
See application file for complete search history.

(56) References Cited

U.S. PATENT DOCUMENTS

| 4,012,124 | A |   | 3/1977  | Toda et al. ............... 359/700 |
| 4,272,174 | A | * | 6/1981  | Teramoto et al. .......... 396/137 |
| 5,268,794 | A |   | 12/1993 | Chan ....................... 359/699 |
| 5,386,740 | A |   | 2/1995  | Nomura et al. ............ 74/89.16 |
| 5,485,315 | A |   | 1/1996  | Nomura et al. ............ 359/701 |
| 6,064,533 | A |   | 5/2000  | Kenin et al. ............... 359/695 |
| 6,115,189 | A | * | 9/2000  | Nomura et al. ............ 359/694 |
| 6,115,190 | A |   | 9/2000  | Hirai ........................ 359/694 |
| 6,195,212 | B1| * | 2/2001  | Miyamoto ................. 359/699 |
| 7,079,762 | B2|   | 7/2006  | Nomura ..................... 396/73 |
| 7,265,918 | B2| * | 9/2007  | Sasaki ....................... 359/819 |

(Continued)

FOREIGN PATENT DOCUMENTS

JP          1133014         5/1989

(Continued)

OTHER PUBLICATIONS

English language translation of JP 01-133014, May 25, 1989.

(Continued)

*Primary Examiner*—Loha Ben
(74) *Attorney, Agent, or Firm*—Greenblum & Bernstein, P.L.C.

(57) ABSTRACT

A lens barrel includes a helicoid ring provided with a helicoid; a retractable rotational ring which is guided by the helicoid to move along an optical axis while rotating, wherein the retractable rotational ring includes a pair of split retractable rotational rings which are supported so as to integrally rotate and to be relatively movable in the optical axis direction with respect to each other; first and second slide-engaging portions provided on one and the other of the pair of split retractable rotational rings, wherein the first and second slide-engaging portions are slidably engaged with the helicoid; and a biasing device which biases the pair of split retractable rotational rings in opposite directions in the optical axis direction so that the first and second slide-engaging portions are pressed in opposite directions against an opposing pair of first and second guide surfaces, respectively, of the helicoid of the helicoid ring.

11 Claims, 26 Drawing Sheets

U.S. PATENT DOCUMENTS

| | | |
|---|---|---|
| 2001/0024573 A1 | 9/2001 | Nomura et al. ............. 396/448 |
| 2002/0039241 A1 | 4/2002 | Nomura et al. ............. 359/819 |
| 2003/0081325 A1 | 5/2003 | Nomura et al. ............. 359/700 |

FOREIGN PATENT DOCUMENTS

| | | |
|---|---|---|
| JP | 593835 | 4/1993 |
| JP | 11119079 | 4/1999 |
| JP | 2004170961 | 6/2004 |

OTHER PUBLICATIONS

English language Abstract and translation of JP 11-119079, Apr. 30, 1999.

* cited by examiner

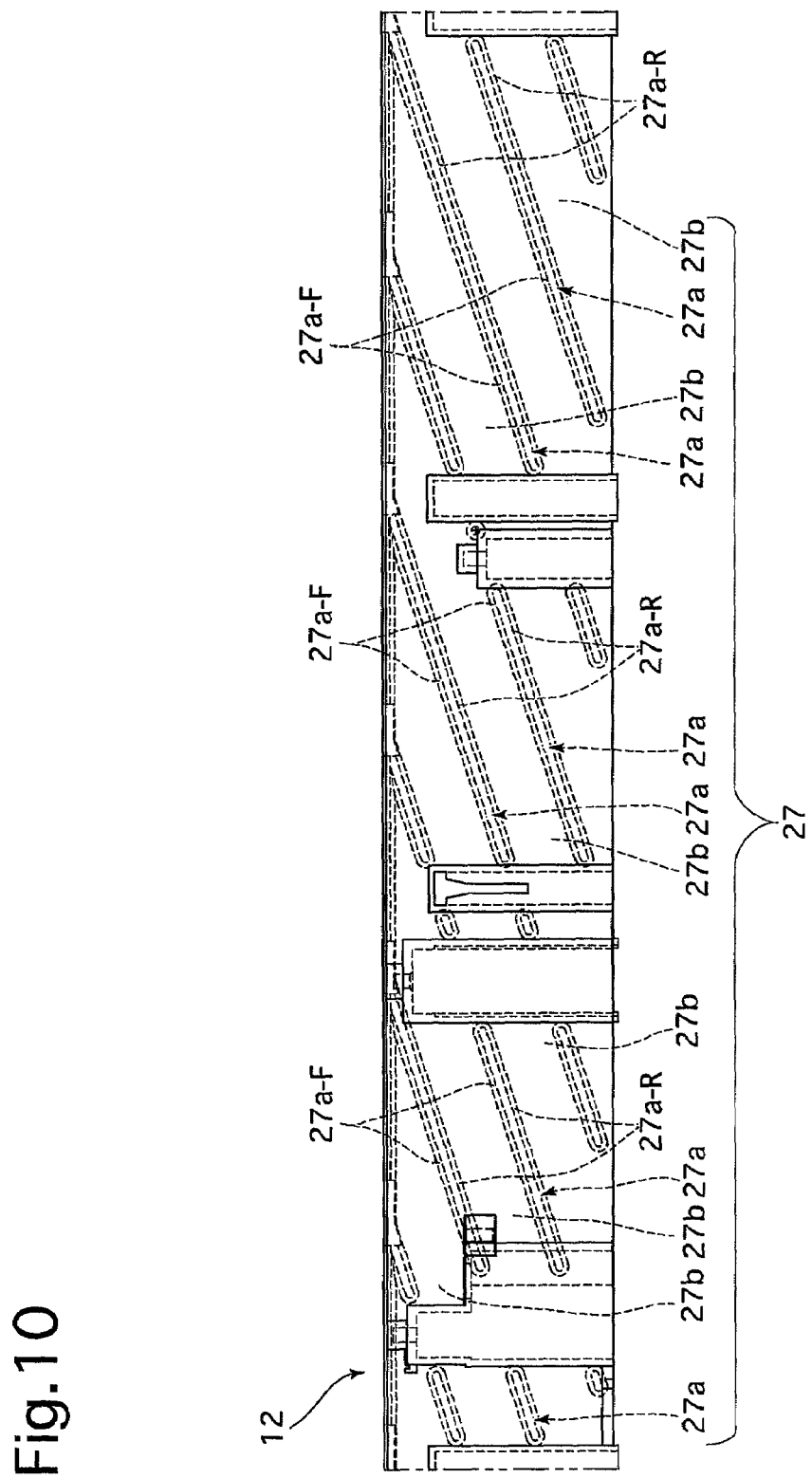

LENS BARREL

BACKGROUND OF THE INVENTION

1. Field of the Invention

The present invention relates to a lens barrel, and in particular, relates to a backlash-removal structure for a retractable rotational ring which is moved along an optical axis direction while rotating in accordance with a helicoid.

2. Description of the Related Art

It is essential for structural play (backlash) to exist among movable members of a lens barrel. However, since backlash also adversely affects the movement precision of the movable members, various backlash-removal structures have been proposed. For example, the applicant of the present invention has proposed, in U.S. Pat. No. 7,079,762, a simple, compact backlash-removal structure for a rotational ring which is rotated (rotationally driven) about the optical axis.

In this backlash-removal structure proposed in U.S. Pat. No. 7,079,762, the rotational ring rotates at a fixed location without changing position in the optical axis direction. However, a retractable rotational ring which rotates and moves along an optical axis in accordance with a helicoid is often used as a movable member of a lens barrel instead of the above-mentioned movable member (rotational ring) which rotates at a fixed location.

SUMMARY OF THE INVENTION

The present invention provides a simple, compact backlash-removal structure for a retractable rotational ring in a lens barrel. Furthermore, in the case where the retractable rotational ring is driven via a gear mechanism, the present invention also provides a lens barrel in which such a gear mechanism and the backlash-removal structure for a retractable rotational ring do not interfere with each other while also maintaining adequate driving precision in the gear mechanism.

According to an aspect of the present invention, a lens barrel which accommodates a lens system is provided, including a helicoid ring provided with a helicoid on one of an inner and outer circumferential surface thereof; a retractable rotational ring which is guided by the helicoid of the helicoid ring to move along an optical axis of the lens system while rotating, wherein the retractable rotational ring includes a pair of split retractable rotational rings which are supported so as to integrally rotate and to be relatively movable in the optical axis direction with respect to each other; a first slide-engaging portion and a second slide-engaging portion provided on one and the other of the pair of split retractable rotational rings, wherein the first and second slide-engaging portions are slidably engaged with the helicoid of the helicoid ring; and a biasing device which biases the pair of split retractable rotational rings in opposite directions in the optical axis direction so that the first and second slide-engaging portions are pressed in opposite directions against an opposing pair of first and second guide surfaces, respectively, of the helicoid of the helicoid ring.

It is desirable for the first slide-engaging portion to include helicoid threads which screw-engage with the helicoid of the helicoid ring, and for the second slide-engaging portion to include sub-helicoid projections which are smaller that the helicoid threads.

It is desirable for recesses to be formed on end portions of one of the split retractable rotational rings on which the helicoid threads are provided so as to cut-out portions of the helicoid thread, wherein the recesses each accommodate respective sub-helicoid projections provided on the other of the split retractable rotational rings.

It is desirable for the lens barrel to include a drive gear which transmits a rotational force to the retractable rotational ring so as to rotate the retractable rotational ring, wherein a circumferential gear formed on the helicoid threads meshes with the drive gear, and a gear portion is formed on each of the sub-helicoid projections, wherein the gear portion does not interfere with the drive gear.

It is desirable for teeth of the gear portion to be formed smaller than teeth of the circumferential gear.

It is desirable for radial heights and circumferential widths of the teeth of the gear portion to be smaller than radial heights and circumferential widths of the teeth of the circumferential gear.

It is desirable for the helicoid to be formed on the inner circumferential surface of the helicoid ring, and for the first and second slide-engaging portions to be provided on outer circumferential surfaces of the one and the other of the pair of split retractable rotational rings.

Alternatively, the helicoid can be formed on the outer circumferential surface of the helicoid ring, and the first and second slide-engaging portions can be provided on inner circumferential surfaces of the one and the other of the pair of split retractable rotational rings.

It is desirable for the biasing device to include at least one compression coil spring provided between opposing end surfaces of the pair of split retractable rotational rings.

The lens barrel can include a linear ring supported within the pair of retractable rotational rings to be movable in the optical axis direction, wherein the pair of split retractable rotational rings are respectively connected to the linear ring via a rotational guide mechanism which allows the pair of split retractable rotational rings to rotate relative to the linear ring, and allows movement in the optical axis direction to be transferred between the pair of split retractable rotational rings and the linear ring. The rotational guide mechanism allows a small amount of relative movement of the split retractable rotational rings in the optical axis direction.

It is desirable for the lens system to include at least two movable lens groups which are relatively movable along the optical axis via rotation of the pair of split retractable rotational rings.

According to the present invention, backlash removal in a retractable rotational ring in a lens barrel can be carried out with a simple, compact structure.

Furthermore, according to the present invention, a lens barrel can be provided in which, in the case where the retractable rotational ring is driven via a gear mechanism, the gear mechanism and the backlash-removal structure for a retractable rotational ring do not interfere with each other while also maintaining adequate driving precision in the gear mechanism.

The present disclosure relates to subject matter contained in Japanese Patent Application No. 2006-145607 (filed on May 25, 2006) which is expressly incorporated herein in its entirety.

BRIEF DESCRIPTION OF THE DRAWINGS

The present invention will be discussed below in detail with reference to the accompanying drawings, in which:

FIG. 10 is a developed view of the stationary barrel of the zoom lens barrel according to the present invention;

DESCRIPTION OF THE PREFERRED EMBODIMENTS

Figure 1:
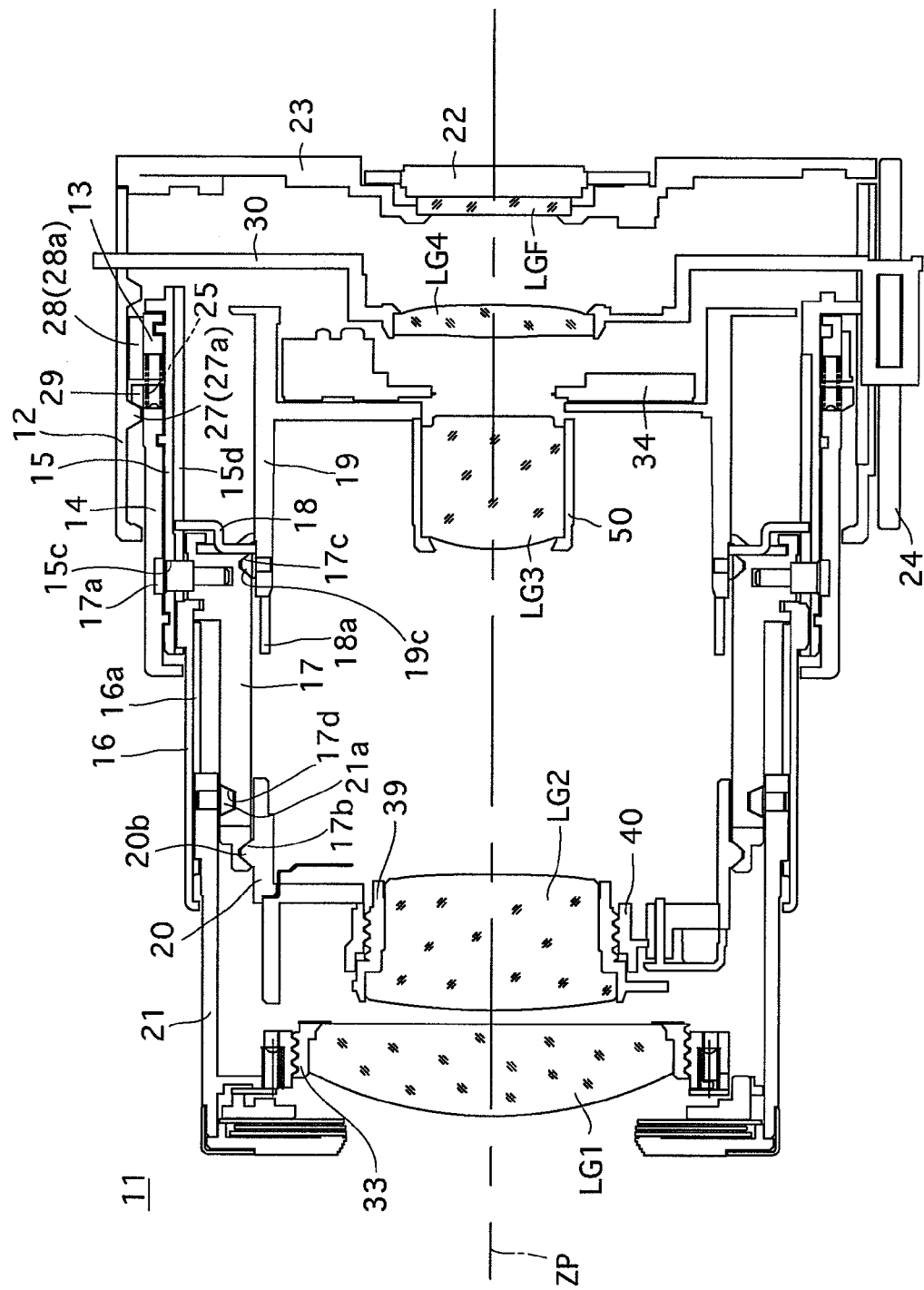
FIG. 1 is a longitudinal sectional view of a zoom lens barrel in a photographable state at the wide-angle extremity, according to the present invention.
Figure 2:
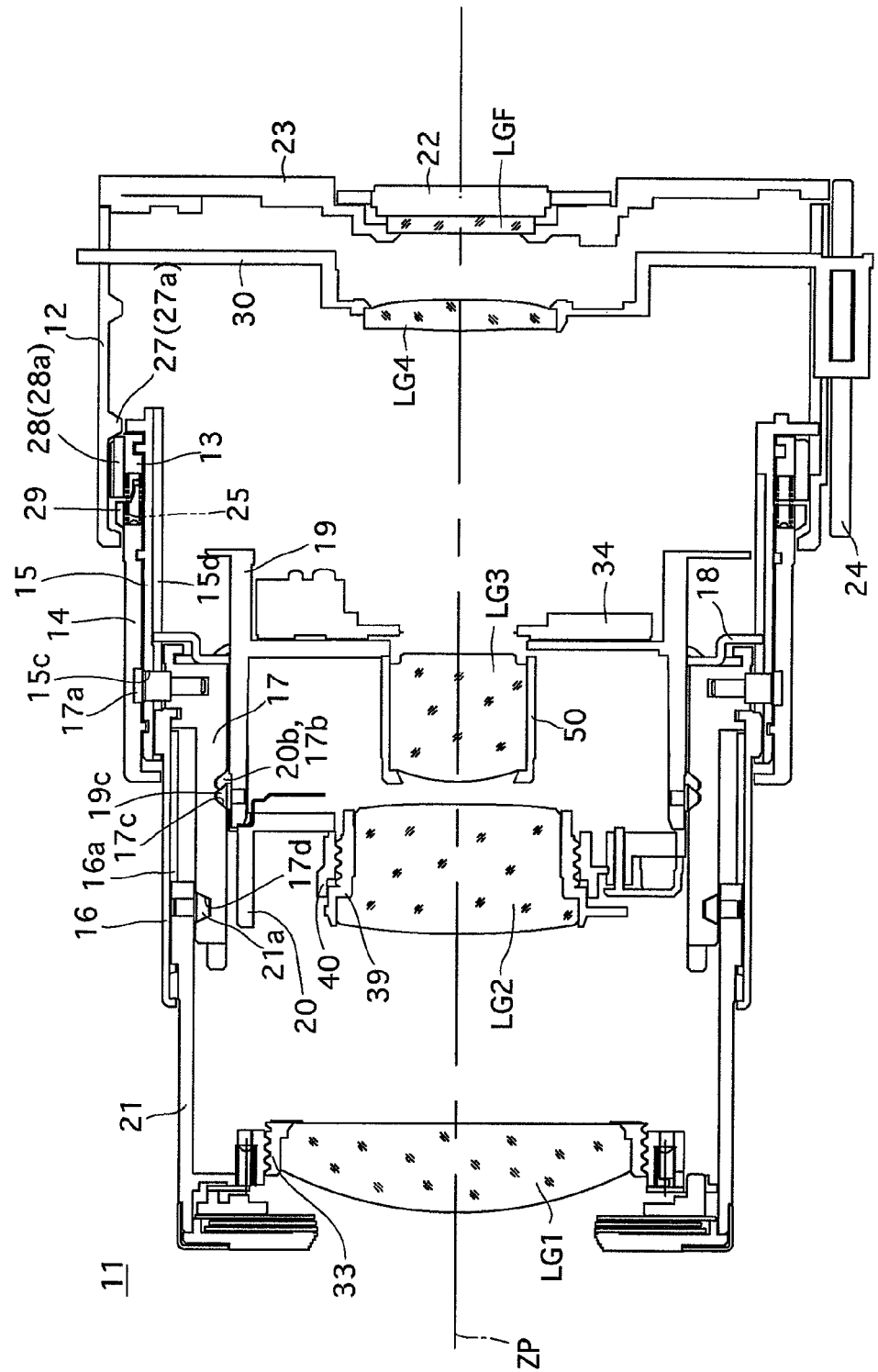
FIG. 2 is a longitudinal sectional view of the zoom lens barrel in a photographable state at the telephoto extremity, according to the present invention.
Figure 3:
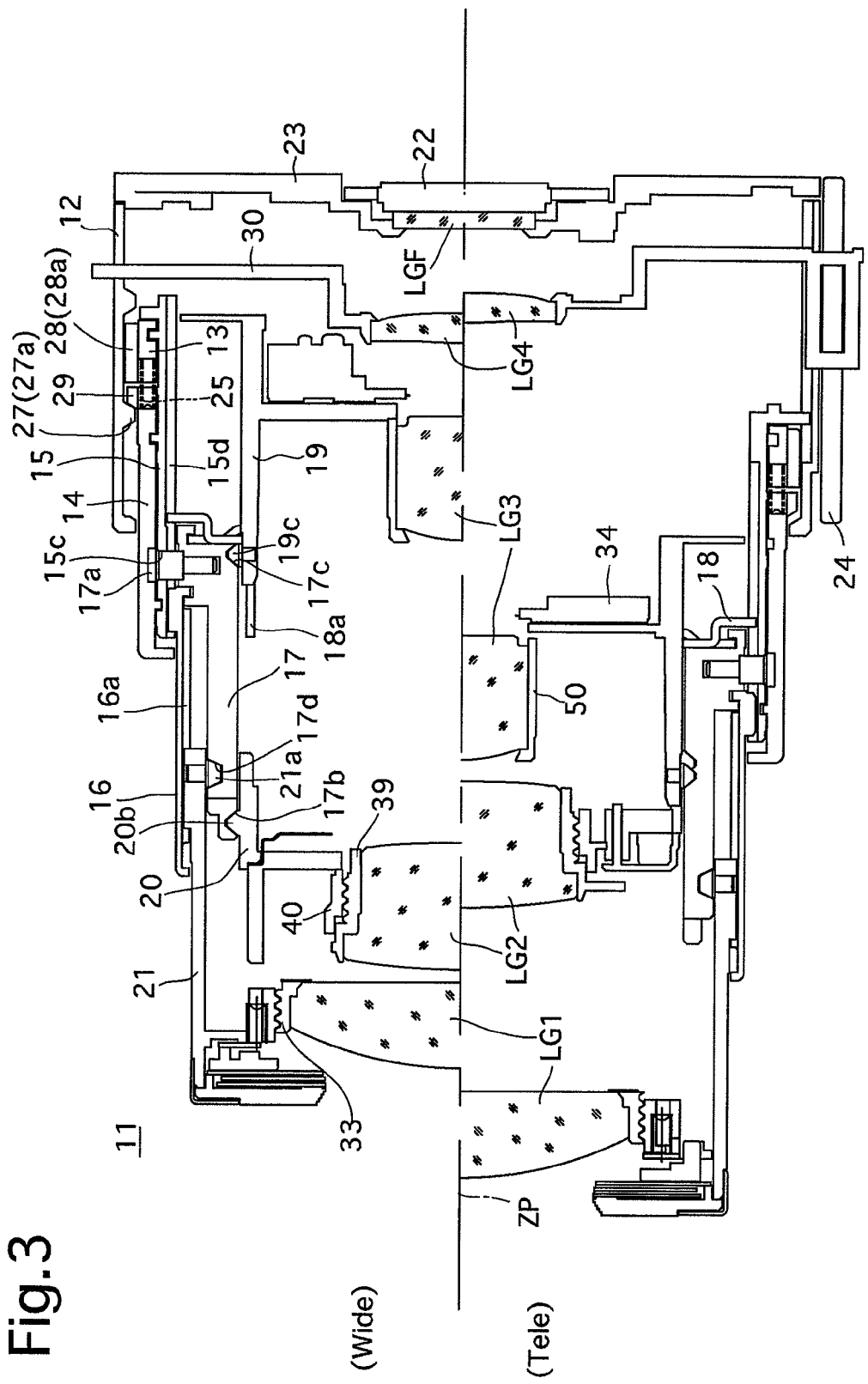
FIG. 3 is a longitudinal sectional view of zoom lens barrel simultaneously showing the photographable state at the wide-angle extremity (shown above the optical axis) and the photographable state at the telephoto extremity (shown below the optical axis) of the zoom lens barrel, according to the present invention.

A zoom lens barrel 11 of a digital camera shown in the sectional views of FIGS. 1 through 4 extends forward (telescopes) toward the object side, as shown in FIGS. 1 through 3, to be extended in length along an optical axis direction thereof in a photographable state, and retracts (contracts) in the optical axis direction to a non-photographable state (accommodation state). FIG. 1 shows the photographable state at the wide-angle extremity of the zoom lens barrel 11, and FIG. 2 shows the photographable state at the telephoto extremity of the zoom lens barrel 11. FIG. 3 shows the photographable state at the wide-angle extremity above the photographing optical axis ZP and the photographable state at the telephoto extremity below the photographing optical axis ZP. In the accommodation state shown in FIG. 4, the zoom lens barrel 11 is retracted into a camera body (not shown).

The zoom lens barrel 11 is provided, inside a stationary barrel (helicoid ring) 12, with a plurality of annular members, i.e., a helicoid ring (retractable rotational ring/split retractable rotational ring) 13, a first telescoping barrel (retractable rotational ring/split retractable rotational ring) 14, a first linear guide ring (linear ring) 15, a second telescoping barrel 16, a cam ring 17, a second linear guide ring 18, a third-lens-group support ring 19, a second-lens-group support ring 20, and a first-lens-group support barrel 21, which are all concentrically provided on a common axis (photographing optical axis ZP).

The photographic optical system of the zoom lens barrel 11 includes a first lens group LG1, a second lens group LG2, a third lens group LG3, a fourth lens group LG4, a low-pass filter LGF, and a CCD (imaging device) 22, in that order from the object side. A shutter unit 34 having a shutter and a diaphragm is provided between the third lens group LG3 and the fourth lens group LG4. Out of the first through fourth lens groups LG1 through LG4 provided in this photographing optical system, the outer diameter of the first lens group LG1 is the largest, and the sum of the diameters of the second lens group LG2 and the third lens group LG3 is substantially equal to the diameter of the first lens group LG1. Furthermore, the lens thicknesses of the second lens group LG2 and the third lens group LG3 in the optical axis direction are substantially the same. The axes (optical axes) of the optical elements from the first lens group LG1 to the CCD 22 are all aligned in series on the common photographing optical axis (common optical axis) ZP in the optical axis direction when the zoom lens barrel is in the photographable state shown in FIGS. 1 through 3. Zooming is performed by respectively moving the first through third lens groups LG1 through LG3 along the photographing optical axis ZP (toward the object side and the image side) in accordance with a predetermined zoom path, and focusing is performed by moving the fourth lens group LG4 along the photographing optical axis ZP. It should be noted that in the following descriptions, "optical axis direction" refers to a direction along (or parallel to) the photographing optical axis ZP, in which a direction toward the object side designates a forward direction (front) and a direction toward the image side designates a rearward direction (rear).

Figure 6:
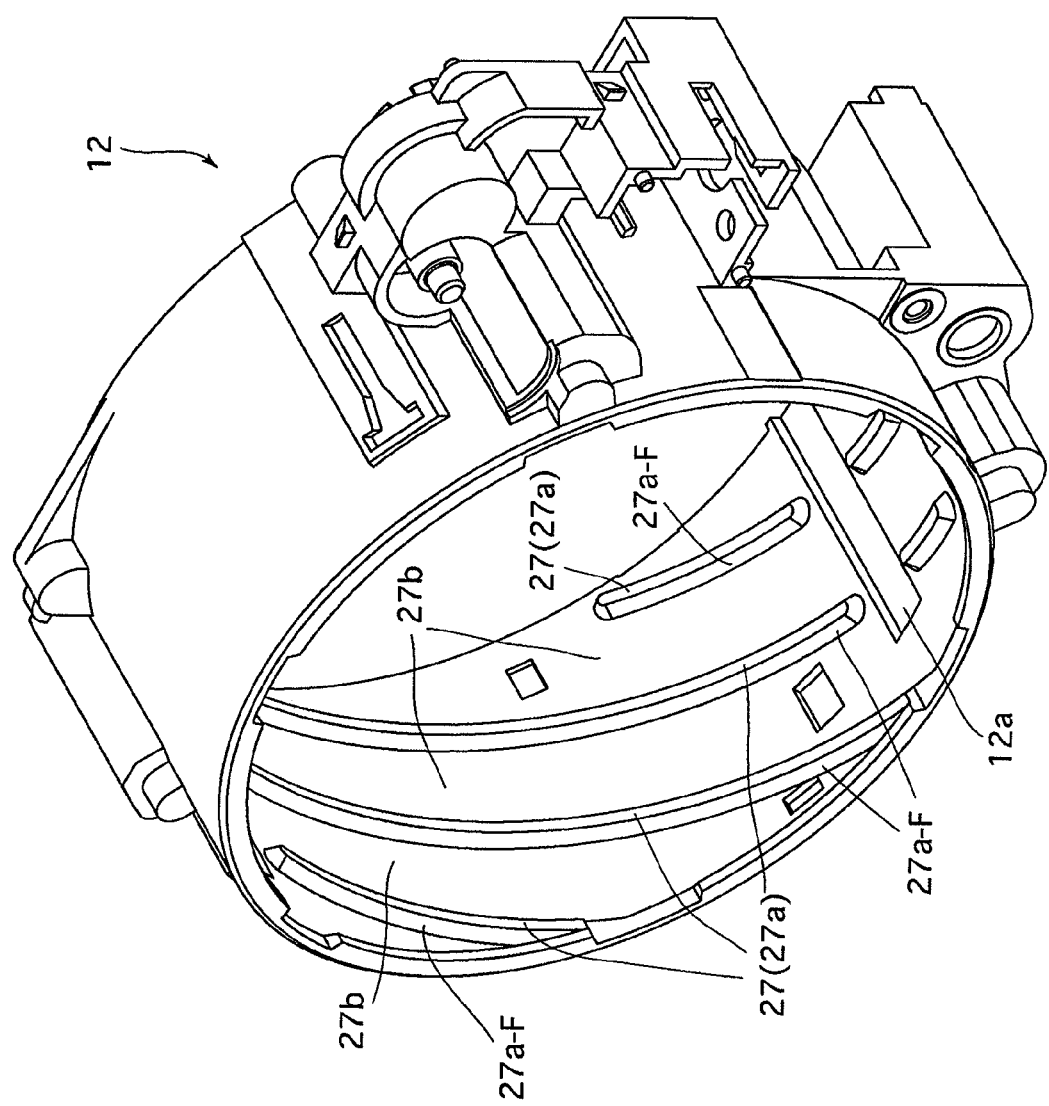
FIG. 6 shows an enlarged perspective view of the stationary barrel of the zoom lens barrel according to the present invention.
Figure 17:
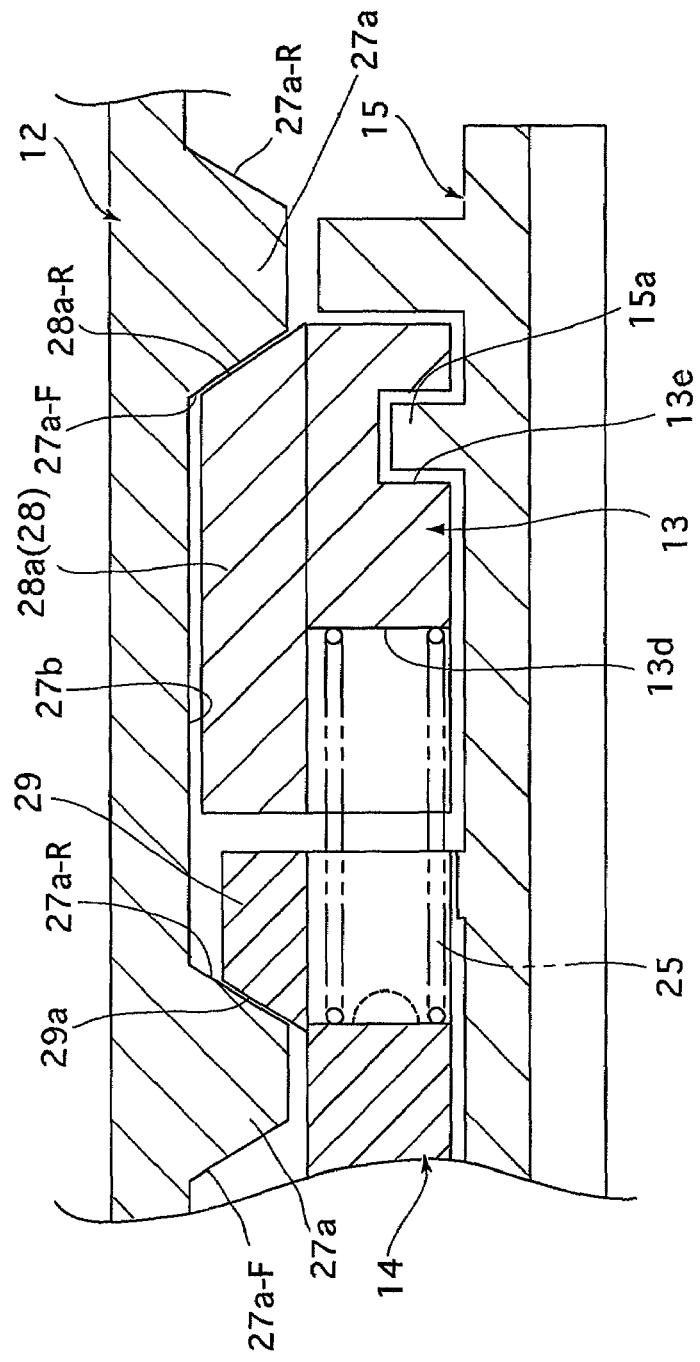
FIG. 17 shows a sectional view of a portion of the helicoid mechanism, taken along the lines A-A of FIG. 16.
Figure 18:
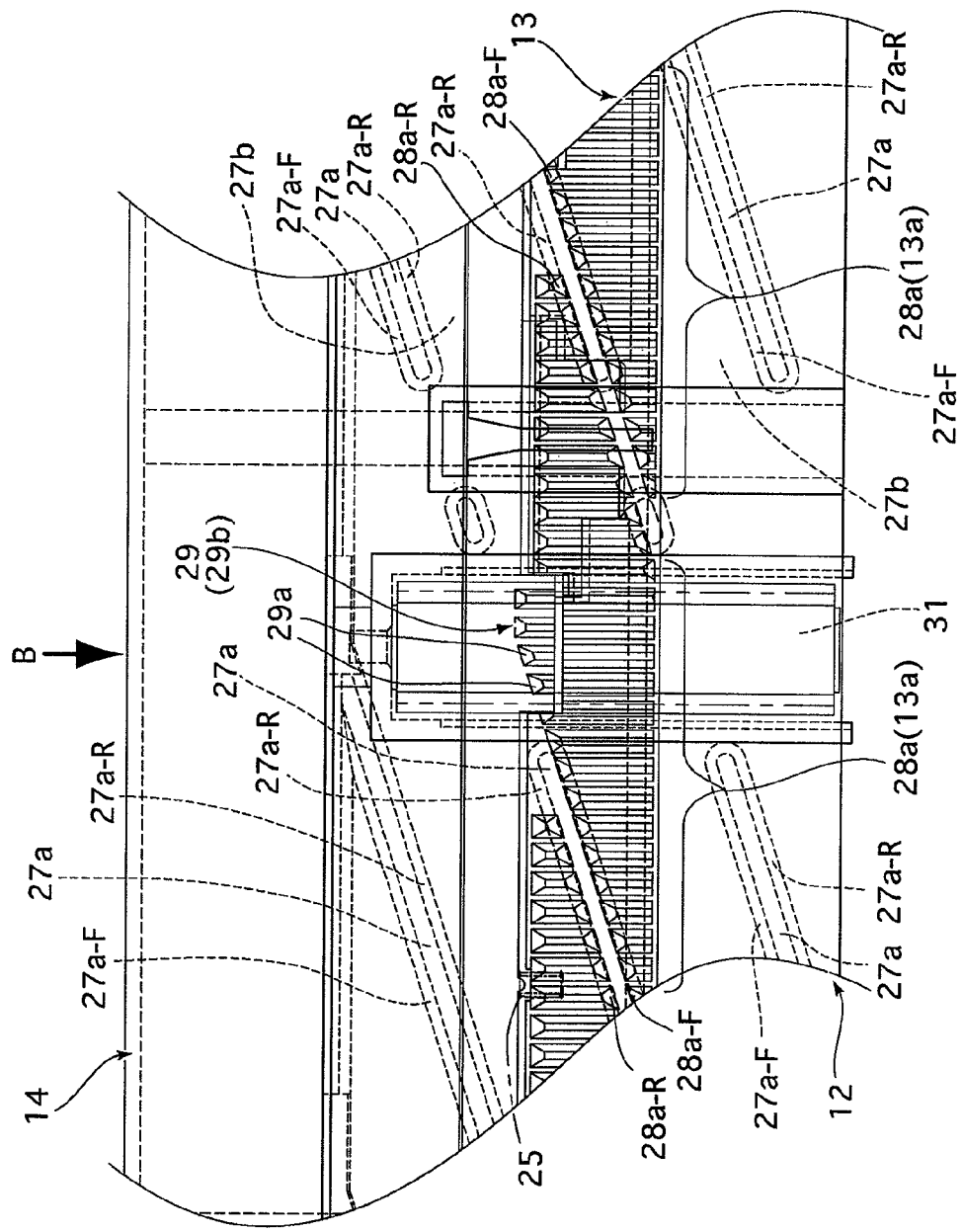
FIG. 18 shows an enlarged portion of a developed view of an engaging portion between a zoom gear and an annular gear of the helicoid ring in the state shown in FIG. 14.
Figure 19:
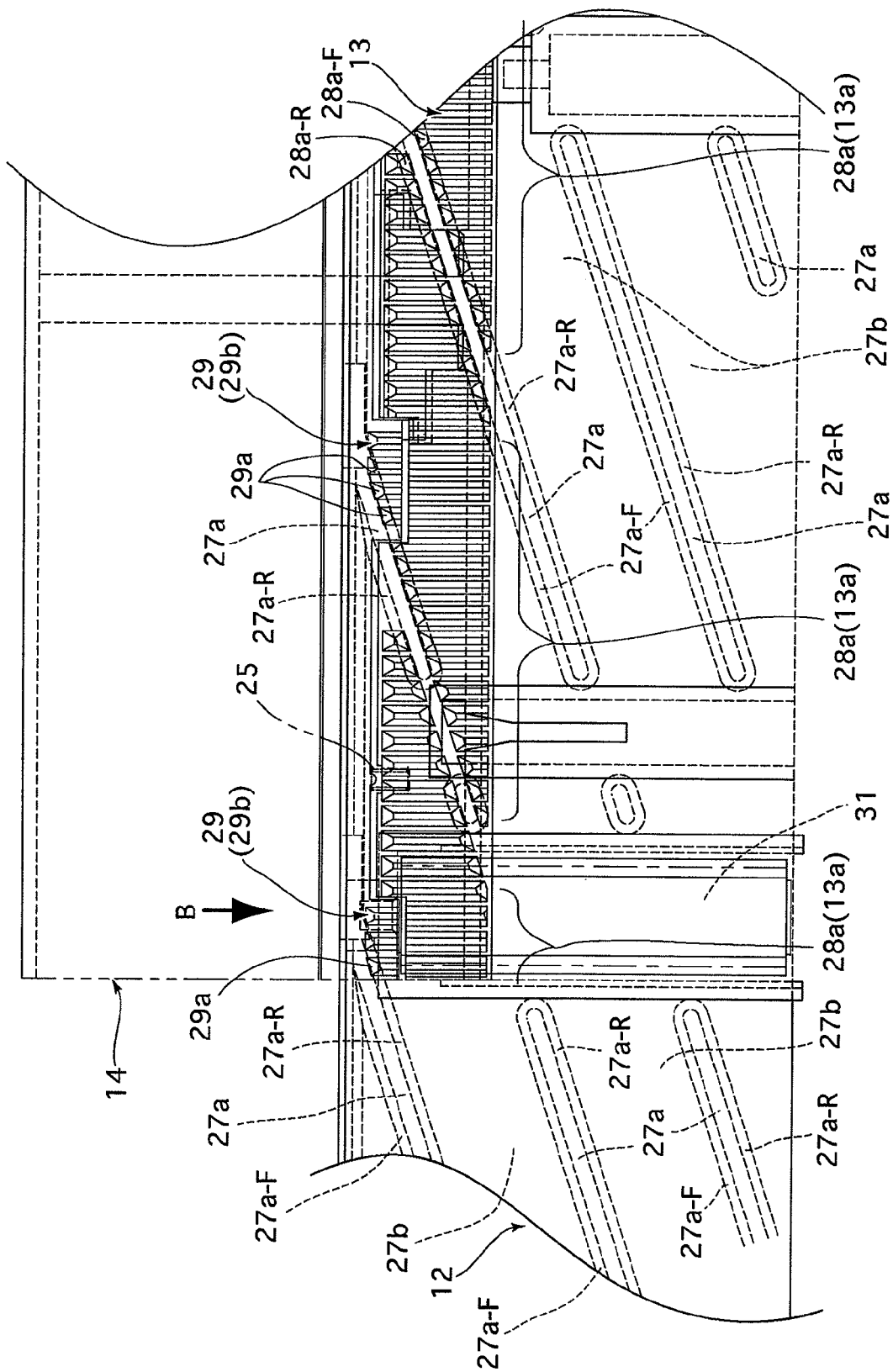
FIG. 19 shows an enlarged portion of a developed view of an engaging portion between a zoom gear and an annular gear of the helicoid ring in the state shown in FIG. 15.
Figure 20:
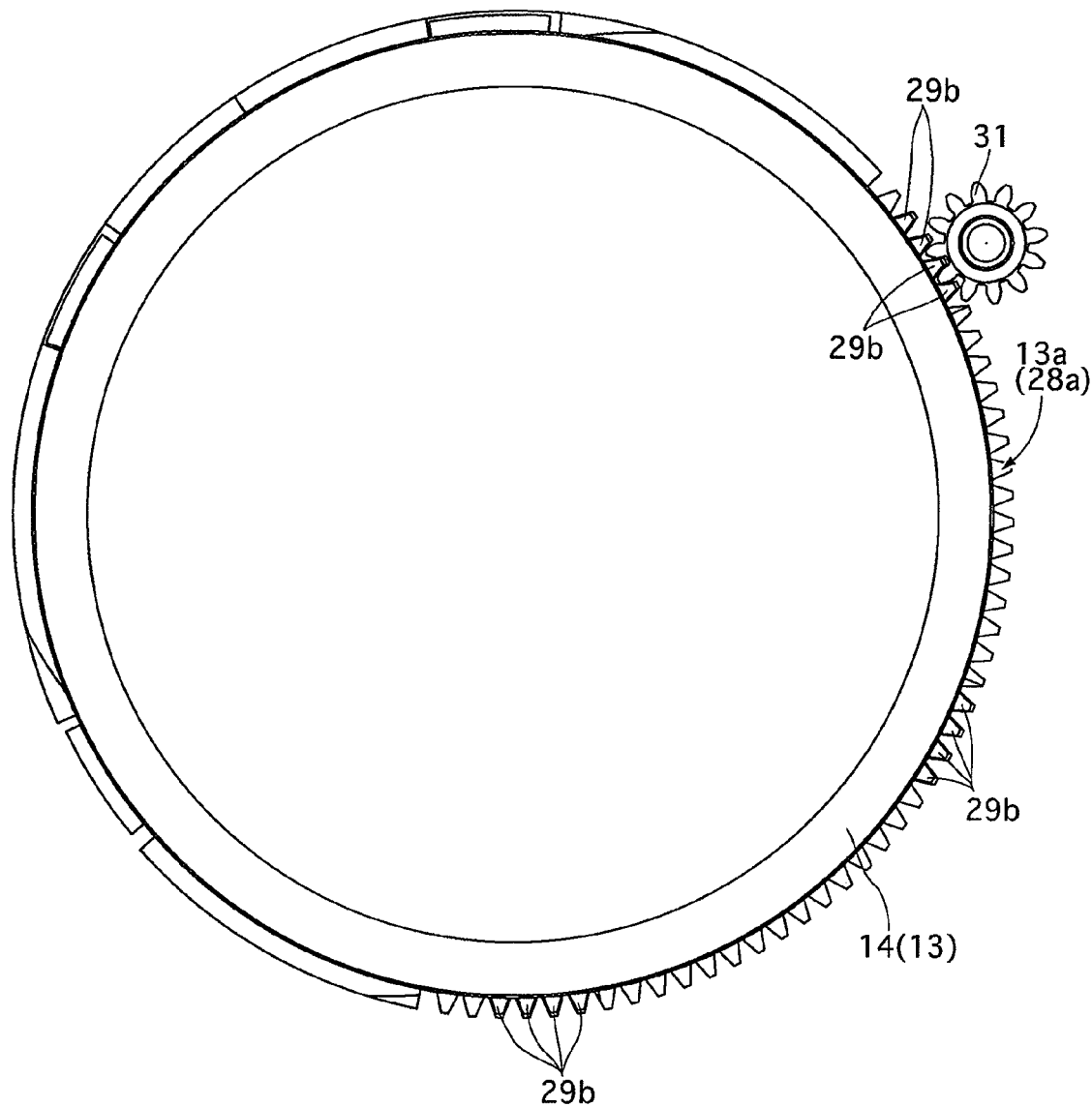
FIG. 20 shows a front elevational view of the zoom gear, the helicoid ring, and the first telescoping barrel as viewed in a direction B shown in FIGS. 18 and 19.

A stationary CCD holder 23 is fixed to the stationary barrel 12. The CCD 22 and the low-pass filter LGF are fixed to (supported by) the stationary CCD holder 23. As shown in FIG. 6, a female helicoid 27 is formed on the inner circumferential surface of the stationary barrel 12. As shown in FIG. 10, the female helicoid 27 is formed by six lead threads (helicoid threads) 27a and root portions 27b formed between adjacent lead threads 27a. As shown in FIG. 17, each lead thread 27a has a trapezoid cross-sectional shape, has a front lead surface (first guide surface) 27a-F on a front side thereof and has a rear lead surface (second guide surface) 27a-R on a rear side thereof. It should be noted that in the present invention, though the lead threads 27a are provided in a discontinuous manner, a lead thread 27a which has front and rear lead surfaces 27a-F and 27a-R which are respectively aligned in a straight line (in a developed view) is regarded as a single lead thread 27a.

A fourth-lens-group frame 30 which supports the fourth lens group LG4 is linearly guided along the optical axis direction via guide shafts 24 (only one guide shaft 24 is shown in FIGS. 1 through 4), and can be driven forwards/rearwards in the optical axis direction via a focusing motor (not shown).

The zoom lens barrel 11 is provided with a zoom motor (not shown). The drive force of this zoom motor is transmitted to a zoom gear (drive gear) 31 (see FIGS. 13 through 15, and FIGS. 18 through 21) via a reduction gear train (not shown). The zoom gear 31 is rotatably supported on a gear shaft which is fixed to the stationary barrel 12 and extends in optical axis direction.

Figure 7:
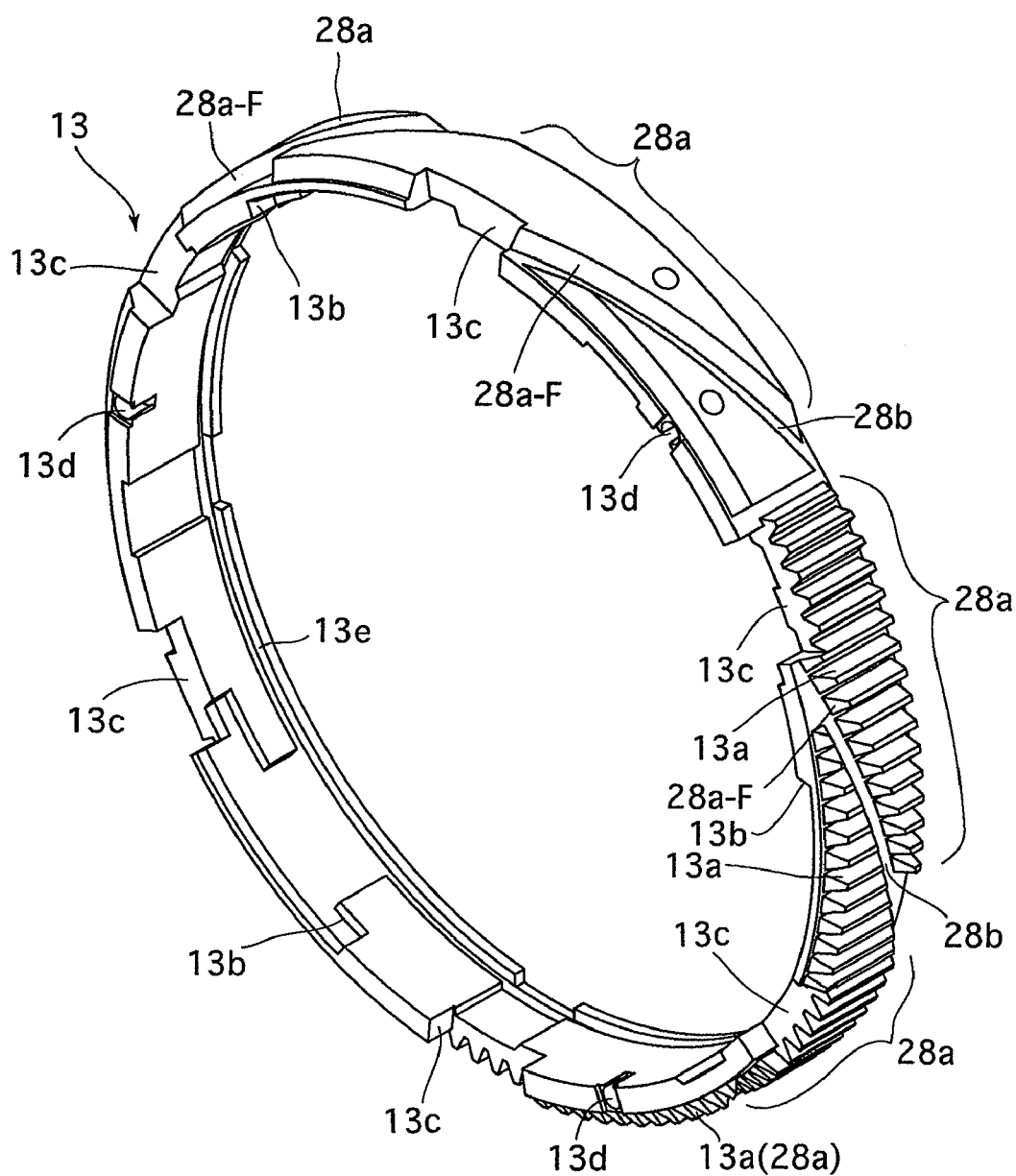
FIG. 7 shows an enlarged perspective view of the helicoid ring of the zoom lens barrel according to the present invention.
Figure 11:
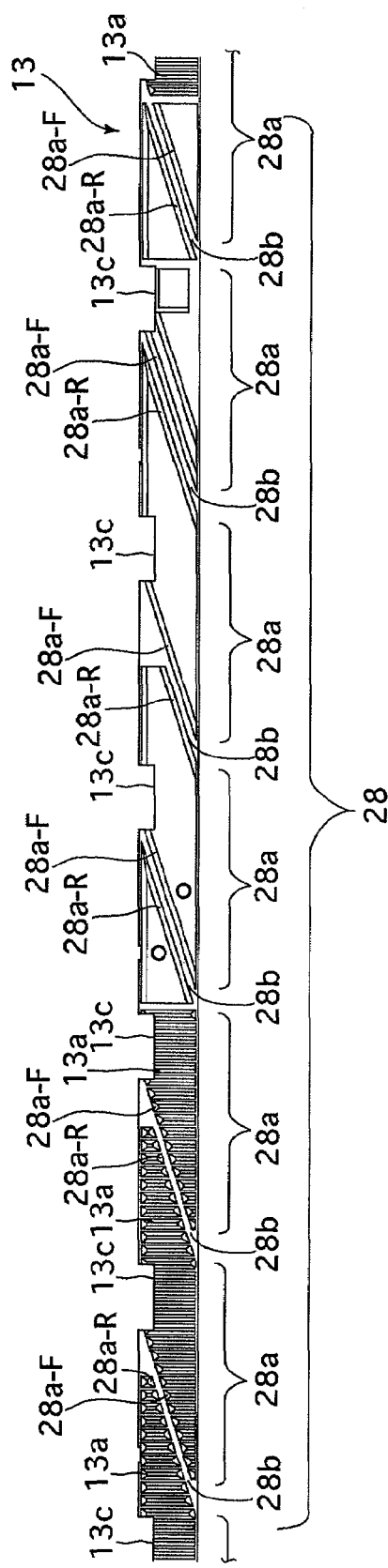
FIG. 11 is a developed view of the helicoid ring of the zoom lens barrel according to the present invention.

The helicoid ring 13 is supported inside the stationary barrel 12, and a male helicoid 28 formed on the outer circumferential surface of the helicoid ring 13 is engaged with the female helicoid 27 formed on the inner circumferential surface of the stationary barrel 12. As shown in FIGS. 7 and 11, the male helicoid 28 is provided with six helicoid threads (first slide-engaging portions) 28a and root portions 28b formed in between adjacent helicoid threads 28a. When the female helicoid 27 and the male helicoid 28 are screw-engaged with each other, the helicoid threads 28a of the male helicoid 28 are engaged with the root portions 27b of the female helicoid 27, and the lead threads 27a are engaged with the root portions 28b of the male helicoid 28, respectively. Each helicoid thread 28a has a trapezoidal cross-sectional shape, has a front lead surface 28a-F facing the rear lead surface 27a-R of the female helicoid 27, and a rear lead surface 28a-R facing the front lead surface 27a-F of the lead thread 27a.

As shown in FIG. 7 and FIG. 11, three of the six lead helicoid threads 28a constituting the male helicoid 28 have a circumferential gear 13a formed on the outer peripheral surface thereof. The zoom gear 31 meshes with the circumferential gear 13a. When the zoom gear 31 is rotatably driven, the rotation force thereof is transmitted to the helicoid gear 13 via the circumferential gear 13a.

Figure 8:
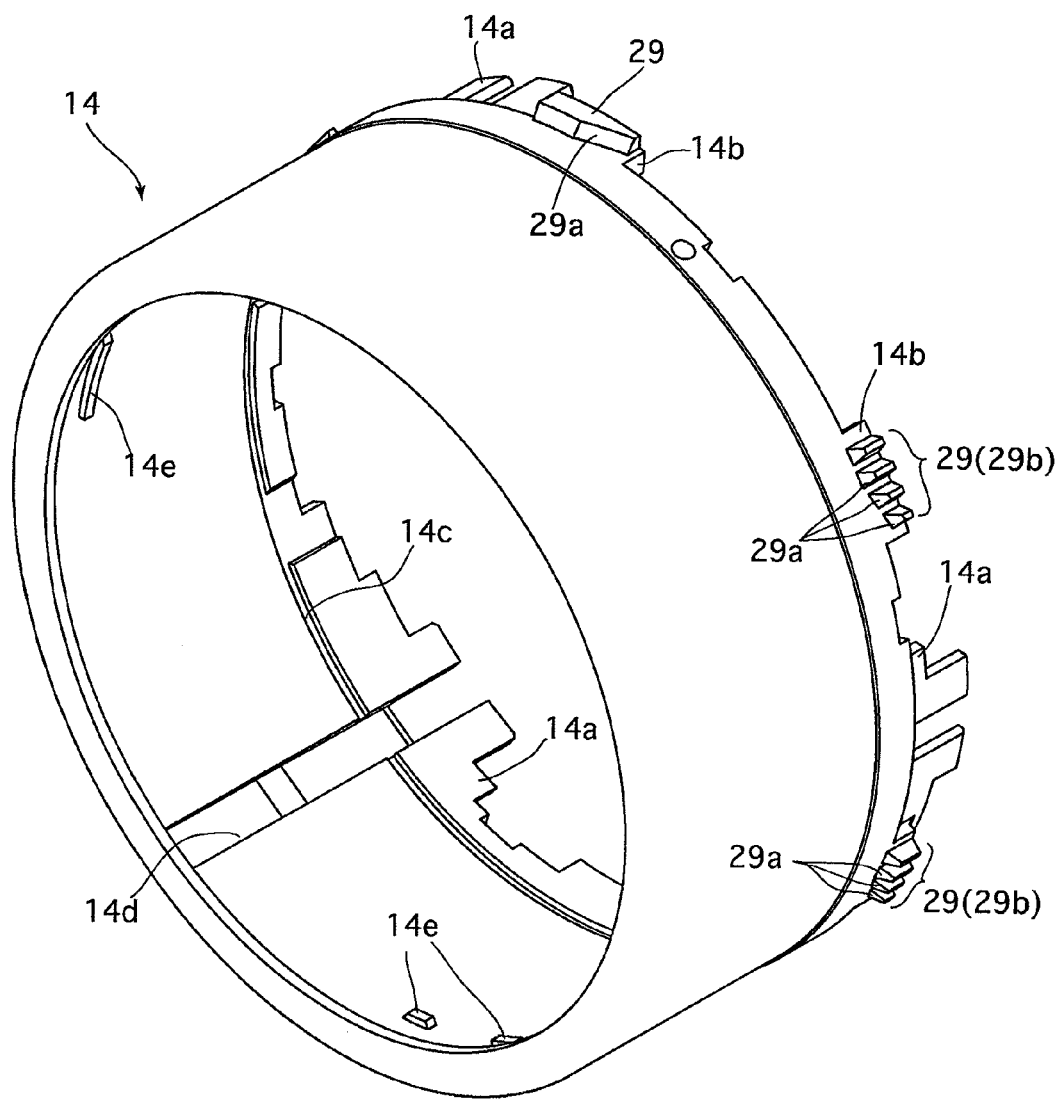
FIG. 8 shows an enlarged perspective view of the first telescoping barrel of the zoom lens barrel according to the present invention.
Figure 12:
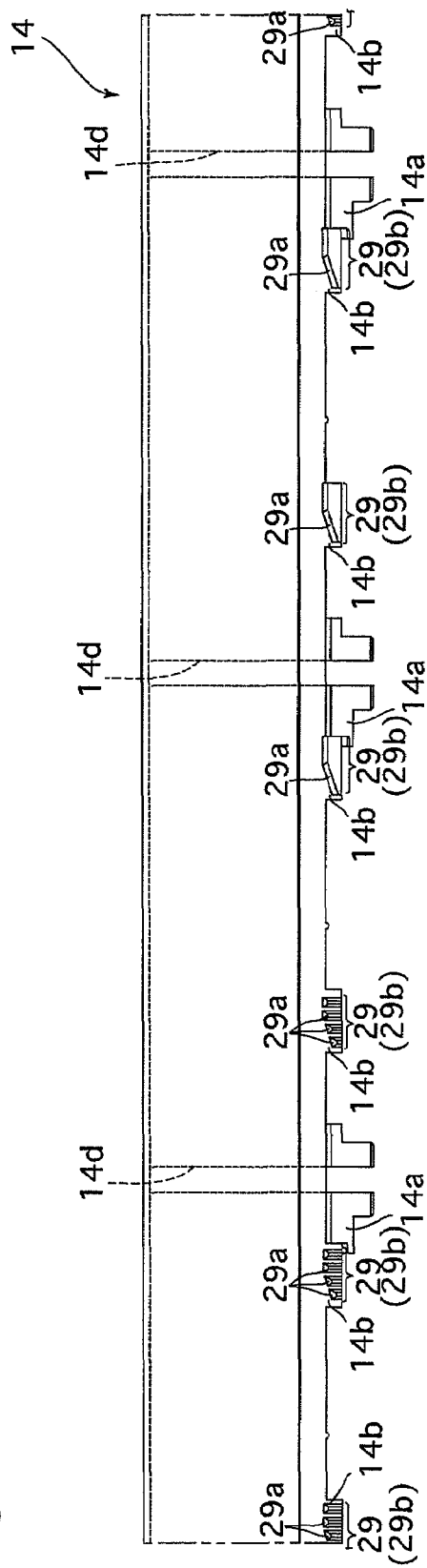
FIG. 12 is a developed view of the first telescoping barrel of the zoom lens barrel according to the present invention.

As shown in FIG. 7, three rotational-transfer recesses 13b are formed on the inner circumferential surface of the helicoid ring 13 at equi-angular intervals. As shown in FIGS. 8 and 12, three rotational-transfer projections 14a, which respectively engage with the corresponding three rotational-transfer recesses 13b, are provided on the rear end circumferential portion of the first telescoping barrel 14. Due to the three rotational-transfer recesses 13b being engaged with the three rotational-transfer projections 14a, the first telescoping barrel 14 integrally rotates with the helicoid ring 13.

As shown in FIGS. 8 and 12, six rearward projections 14b are formed on the rear end portion of the first telescoping barrel 14 provided at differing positions around the circumference thereof. Outer radial protrusions (second slide-engaging portions/sub-helicoid projections) 29 are provided on the outer circumferential surface of each rearward projection 14b. Six front-end recesses 13c are provided on the front end portion of the helicoid ring 13 so as to cut-out portions of the helicoid thread 28a. The rearward projections 14b are respectively engaged into the front-end recesses 13c. The outer radial protrusions 29 are smaller protrusions than the helicoid thread 28a, and with the rearward projections 14b and the front-end recesses 13c in a mutually engaging state, the outer radial protrusions 29 complement (occupy) the cut-out portions (i.e., the front-end recesses 13c) of the male helicoid 28 so as to become one continuous helicoid thread (see FIG. 16). Each outer radial protrusion 29 has a sub-lead surface 29a which is substantially parallel with the front lead surface 28a-F of the corresponding lead helicoid thread 28a, and the sub-lead surface 29a is aligned with the front lead surface 28a-F in a state where the rearward projections 14b and the front-end recesses 13c are engaged with each other.

As shown in FIG. 7, three spring-accommodating holes 13d are formed on the front end surface of the helicoid ring 13 at substantially equi-angular intervals in the circumferential direction thereof. Three compression coil springs (biasing device) 25 are accommodated in the spring-accommodating holes 13d, respectively. The front ends of the compression coil springs 25 protrude from the spring-accommodating holes 13d and abut against the rear end portion of the first telescoping barrel 14 (FIGS. 16 through 19). Each compression coil spring 25 is held in between the helicoid ring 13 and the first telescoping barrel 14 in a compressed state. The compression coil springs 25, in such a compressed state, bias the helicoid ring 13 in the rearward optical axis direction due to the restorative force the compression coil springs 25 possess, and bias the first telescoping barrel 14 forward in the optical axis direction. Due to this biasing force of the compression coil springs 25, the rear lead surfaces 28a-R of the six helicoid threads 28a formed on the helicoid ring 13 are pressed against the front lead surfaces 27a-F of the six lead threads 27a, respectively, and the sub-lead surfaces 29a of the six outer radial protrusions 29 provided on the first telescoping barrel 14 are pressed against the rear lead surfaces 27a-R of the six lead threads 27a, respectively (see FIG. 17).

Upon the helicoid ring 13 receiving a rotational force from the zoom gear 31, the helicoid ring 13 moves along the optical axis direction while rotating due to the slide-engaging relationship between the female helicoid 27 and the male helicoid 28. Specifically, the front and rear lead surfaces 28a-F and 28a-R of each lead helicoid thread 28a are guided by the opposing rear and front lead surfaces 27a-R and 27a-F of each lead thread 27a so as to move the helicoid ring 13 in the optical axis direction. During this movement, since the front lead surfaces 27a-F press against the rear lead surfaces 28a-R due to the biasing force of the compression coil springs 25, the helicoid ring 13 can move relative to the stationary barrel 12 in a smooth and steady manner. Furthermore, the first telescoping barrel 14 moves together with the helicoid ring 13 in the optical axis direction while rotating due to the sub-lead surfaces 29a of the outer radial protrusion 29 being guided by the rear lead surfaces 27a-R of the lead threads 27a (of the female helicoid 27) and pressing thereagainst due to the biasing force of the compression coil springs 25.

Figure 9:
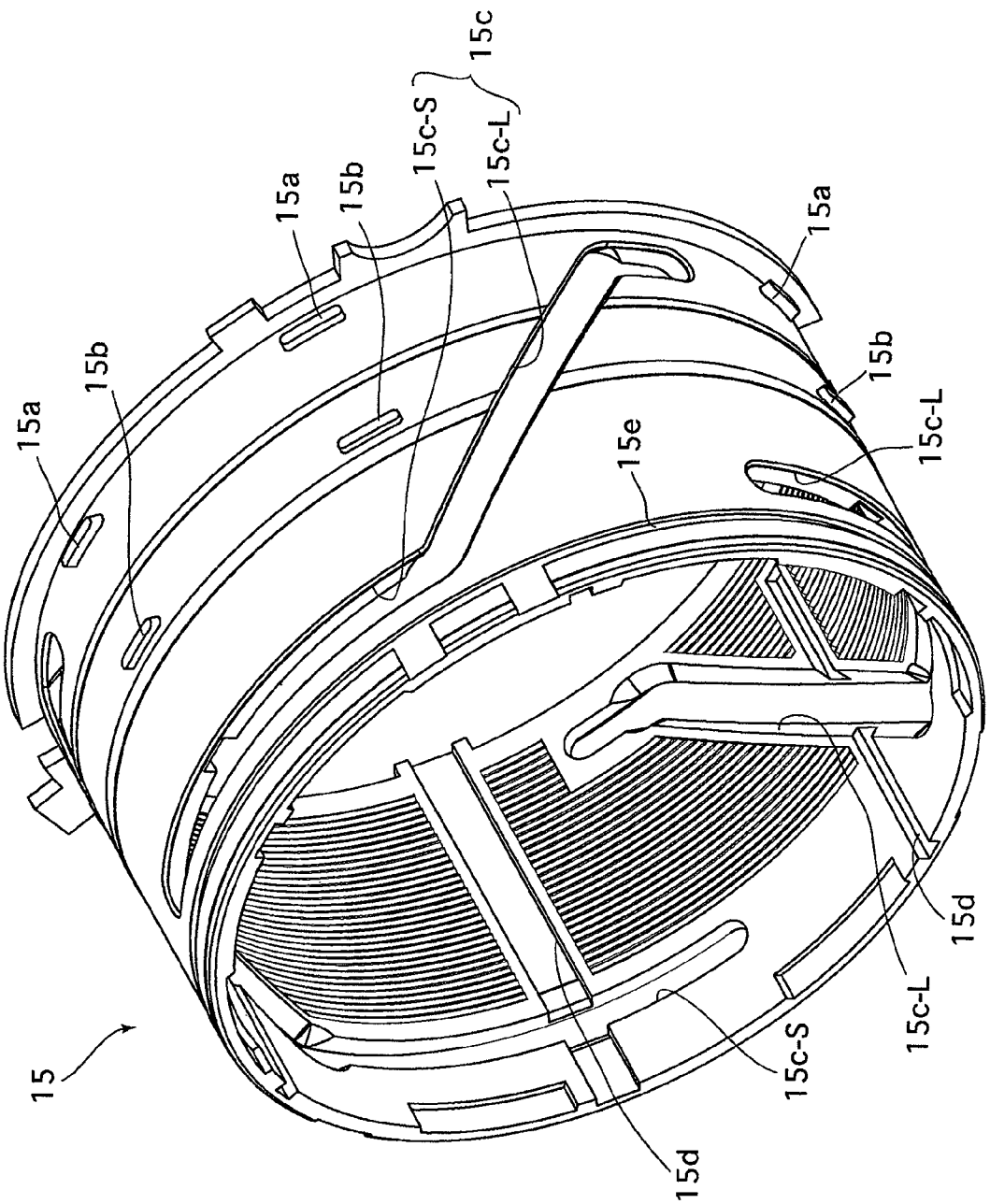
FIG. 9 shows an enlarged perspective view of the first linear guide ring according to the present invention.

The first linear guide ring 15 is supported inside the helicoid ring 13 and the first telescoping barrel 14. The first linear guide ring 15 is linearly guided in the optical axis direction via three linear guide grooves 12a provided in the inner circumferential surface of the stationary barrel 12. The outer peripheral surface of the first linear guide ring 15 is provided with a plurality of outer projections 15a which are positioned at different positions in the circumferential direction and corresponding plurality of outer projections 15b which are positioned at the same positions in the circumferential direction but at different positions with respect to the optical axis direction (see FIG. 9). A circumferential groove 15e is formed on the outer peripheral surface of the first linear guide ring 15 at a different position to those of the outer projections 15a and 15b with respect to the optical axis direction (see FIG. 9). The outer projection 15a engages with an inner circumferential groove 13e formed on the inner circumferential surface of the helicoid ring 13 (see FIG. 7). The outer projection 15b engages with an inner circumferential groove 14c formed on the inner circumferential surface of the first telescoping barrel 14 (see FIG. 8). Inner projections 14e formed on the inner circumferential surface of the first telescoping barrel 14 are engaged with the circumferential groove 15e. Due to the engaging relationship of the outer projections 15a and 15b with the inner circumferential grooves 13e and 14c, respectively, and the engaging relationship of the circumferential groove 15e with the inner projections 14e, the first linear guide ring 15 moves in the optical axis direction together with the helicoid ring 13 and the first telescoping barrel 14.

Three guide through-slots 15c are formed in the first linear guide ring 15 and extend completely through the first linear guide ring 15. Three followers 17a provided on the outer circumferential surface of the cam ring 17 are fitted into the three guide through-slots 15c, respectively, so as to be slidably movable therealong. Each of the guide through-slots 15c is provided with a lead groove portion 15c-L which extends diagonally with respect to the optical axis direction, and a circumferential groove portion 15c-S which extends circumferentially about the optical axis (photographing optical axis ZP) and orthogonal to the optical axis. The three followers 17a further extend radially so as to engage with three rotational-transfer grooves 14d, which are formed in the inner circumferential surface of the first telescoping barrel 14 and extend in the optical axis direction (see FIGS. 8 and 12), so that the cam ring 17 rotates together with the first telescoping barrel 14. The cam ring 17 moves in the optical axis direction while rotating relative to the first linear guide ring 15 while being guided by the lead groove portions 15c-L when the followers 17a are positioned in the lead groove portions 15c-L of the guide through-slots 15c.

The first linear guide ring 15 guides the second linear guide ring 18 and the second telescoping barrel 16 via three linear grooves 15d which are formed in the inner circumferential surface of the first linear guide ring 15 and extend in the optical axis direction. The second linear guide ring 18 and the second telescoping barrel 16 are supported so as to each be relatively rotatable with respect to the cam ring 17 and to integrally move in the optical axis direction.

Figure 23:
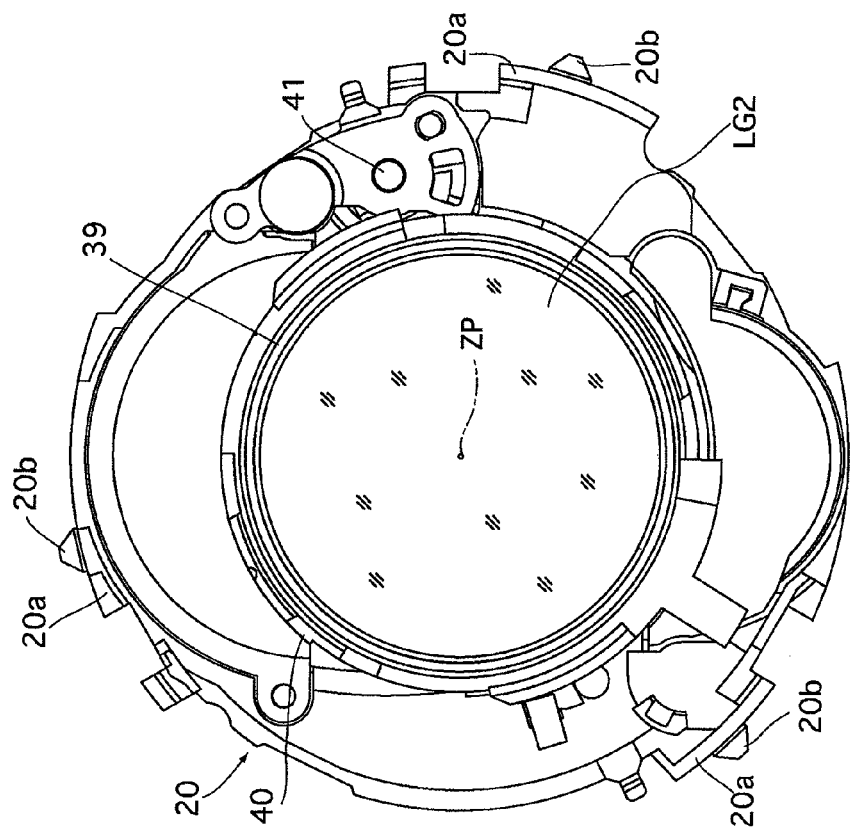
FIG. 23 is a front elevational view of the portion of the zoom lens barrel shown n FIG. 22.
Figure 22:
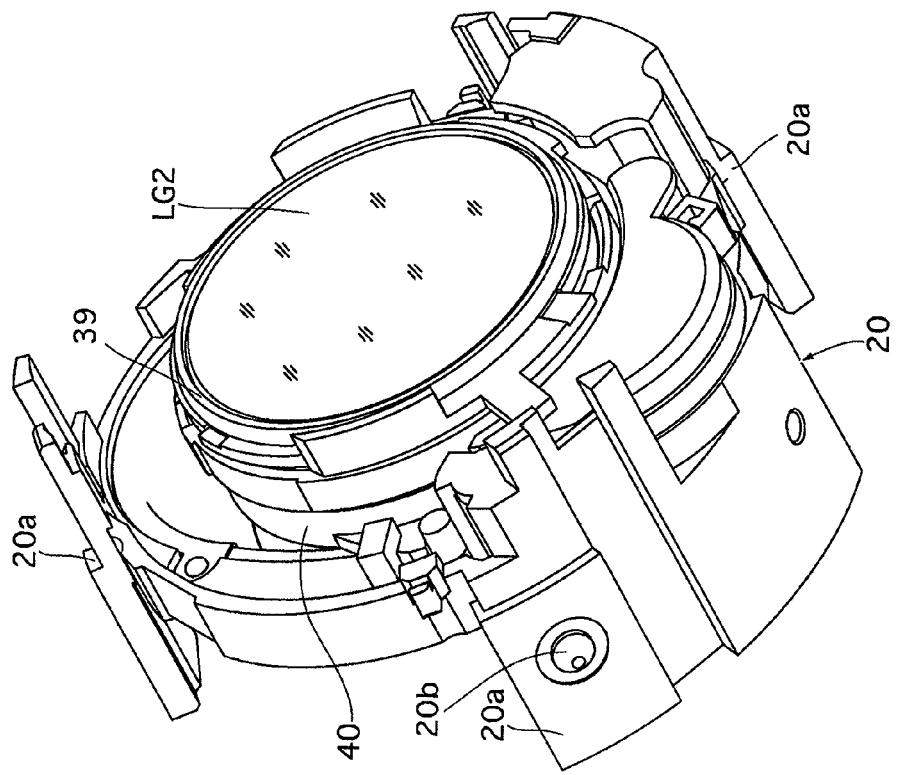
FIG. 22 is a perspective view showing a second-lens-group support ring holding a second-lens-group retractable frame, of the zoom lens barrel according to the present invention.
Figure 24:
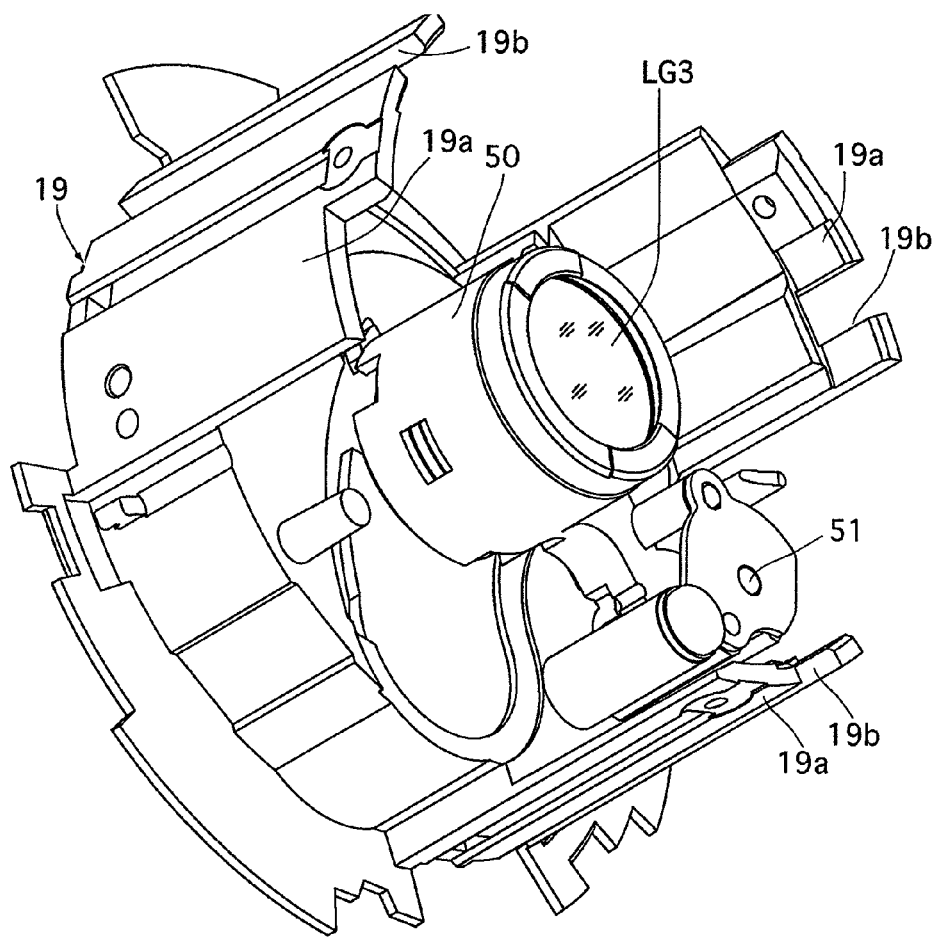
FIG. 24 is a perspective view showing a third-lens-group support ring holding a third-lens-group retracting frame, of the zoom lens barrel according to the present invention.
Figure 25:
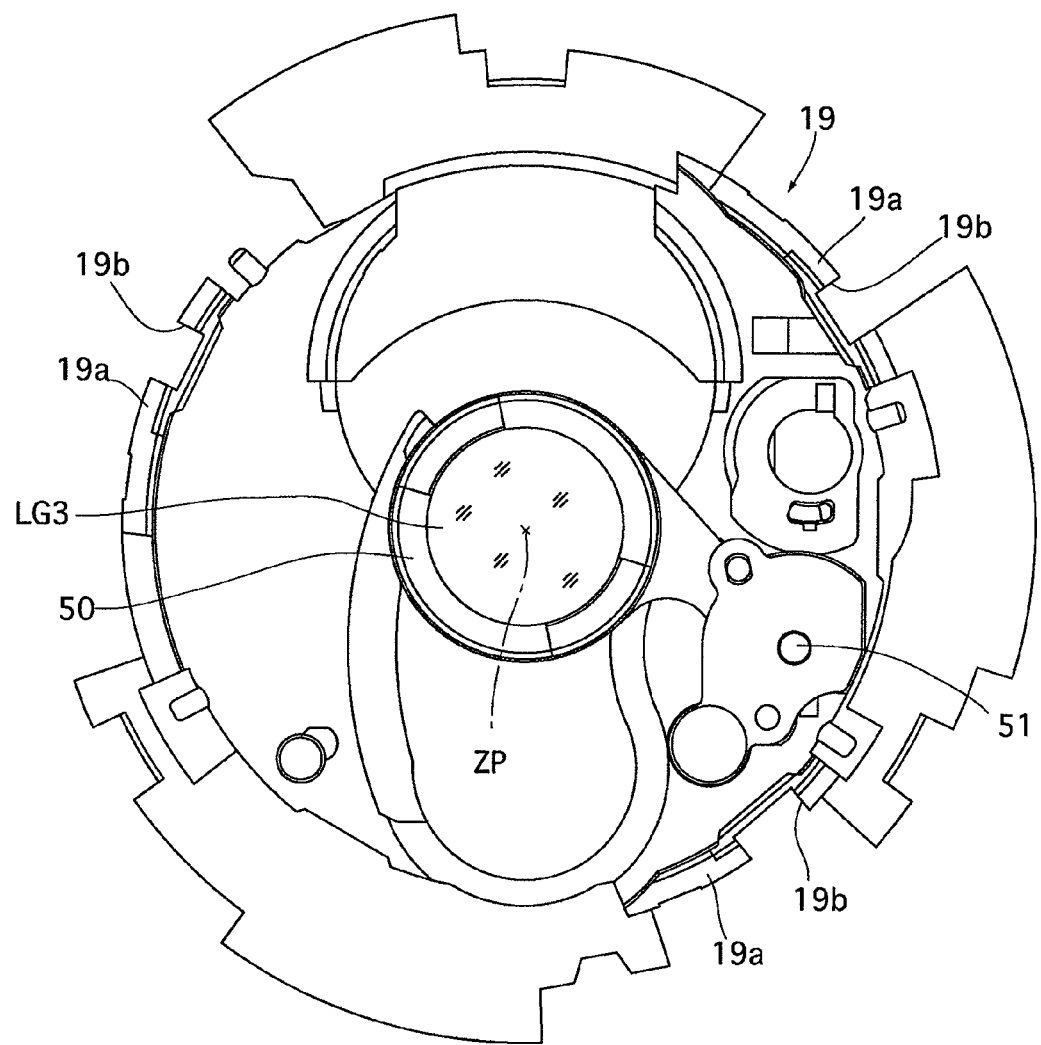
FIG. 25 is a front elevational view of the portion of the zoom lens barrel shown n FIG. 24.

The second linear guide ring 18 is provided with three forward projecting linear guide keys 18a (only one of which is shown in FIGS. 1 and 3). The linear guide keys 18a are each provided with a guide surface which extends in the optical axis direction. The linear guide keys 18a linearly guide the third-lens-group support ring 19 in the optical axis direction. The third-lens-group support ring 19 is provided with three partial cylindrical portions 19a at three different positions in the circumferential direction thereof. Each of the partial cylindrical portions 19a is provided with a linear guide groove 19b formed thereon, so the each of the linear guide key 18a can fit into the respective linear guide groove 19b so as to be slidable therein in the optical axis direction (see FIGS. 24 and 25). Furthermore, the second-lens-group support ring 20 is provided with three partial cylindrical portions 20a (see FIGS. 22 and 23) which are fitted in between the partial cylindrical portions 19a of the third-lens-group support ring 19 so as to be relatively slidable therealong in the optical axis direction. The second-lens-group support ring 20 is linearly movable in the optical axis direction due to the sliding relationship between the partial cylindrical portions 19a and the partial cylindrical portions 20a.

Second-lens-group cam followers 20b provided on the outer circumferential surface of the second-lens-group support ring 20 are engaged with first cam grooves 17b formed on the inner circumferential surface of the cam ring 17, and third-lens-group cam followers 19c provided on the outer circumferential surface of the third-lens-group support ring 19 are engaged with second cam grooves 17c formed on the inner circumferential surface of the cam ring 17. Since the third-lens-group support ring 19 and the second-lens-group support ring 20 are linearly guided in the optical axis direction via the second linear guide ring 18, upon the cam ring 17 being rotated, the third-lens-group support ring 19 and the second-lens-group support ring 20 move in the optical axis direction in a predetermined manner in accordance with the cam profiles of the first cam grooves 17b and the second cam grooves 17c, respectively.

The second telescoping barrel 16, which is linearly guided in the optical axis direction by the first linear guide ring 15, linearly guides the first-lens-group support barrel 21 via linear grooves 16a which are formed on the inner circumferential surface of the second telescoping barrel 16. The first-lens-group support barrel 21 is provided with three first-lens-group cam followers 21a which radially project inwards (toward the optical axis). The first-lens-group cam followers 21a are slidably engaged with outer cam grooves 17d formed on the outer circumferential surface of the cam ring 17. A first-lens-group frame 33 is provided within the first-lens-group support barrel 21 to be supported thereby. The first-lens-group frame 33 holds the first lens group LG1.

The second lens group LG2 is held by a second-lens-group frame 39 (see FIGS. 1 through 4, 22, 23 and 26), and the second-lens-group frame 39 is supported by a radially-retractable frame 40. The radially-retractable frame 40 is rotatably supported by a pivot shaft 41 (see FIG. 23), which extends parallel to the photographing optical axis ZP, inside the second-lens-group support ring 20. The radially-retractable frame 40 can swing (in a radial direction) about the pivot shaft 41 between a photographable position (see FIGS. 1 through 3, 22 and 23) at which the optical axis of the second lens group LG2 is coincident with the photographing optical axis ZP, and a radially retracted position (see FIG. 4) at which the optical axis the of second lens group LG2 is retracted above the photographing optical axis ZP. The radially-retractable frame 40 is (radially) biased toward the photographable position via second-lens-group frame biasing springs (not shown).

Furthermore, a third-lens-group frame 50 which holds the third lens group LG3 is provided inside the third-lens-group support ring 19 and is rotatably supported by a pivot shaft 51 (see FIGS. 24 and 25) which extends parallel to the photographing optical axis ZP. The third-lens-group frame 50 can swing (in a radial direction) about the pivot shaft 51 between a photographable position (see FIGS. 1 through 3, 24 and 25) at which the optical axis of the third lens group LG3 is coincident with the photographing optical axis ZP, and a radially retracted position (see FIG. 4) at which the third lens group LG3 is retracted below the photographing optical axis ZP. The third-lens-group frame 50 is (radially) biased toward the photographable position via third-lens-group frame biasing springs (not shown).

Figure 26:
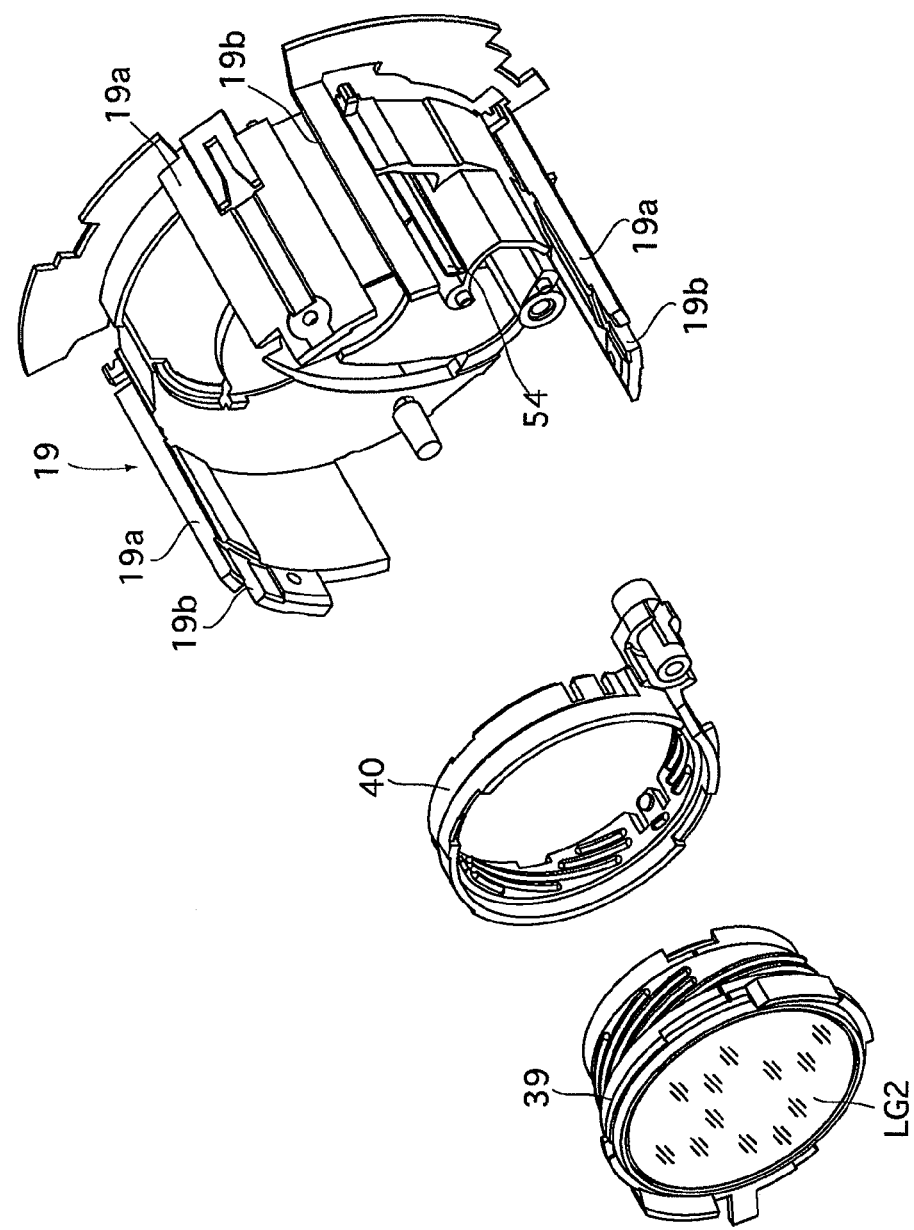
FIG. 26 is an exploded perspective view showing the second-lens-group support frame, the second-lens-group retractable frame and the third-lens-group support ring which has a second-lens-group-retracting cam-bar provided therein.
Figure 27:
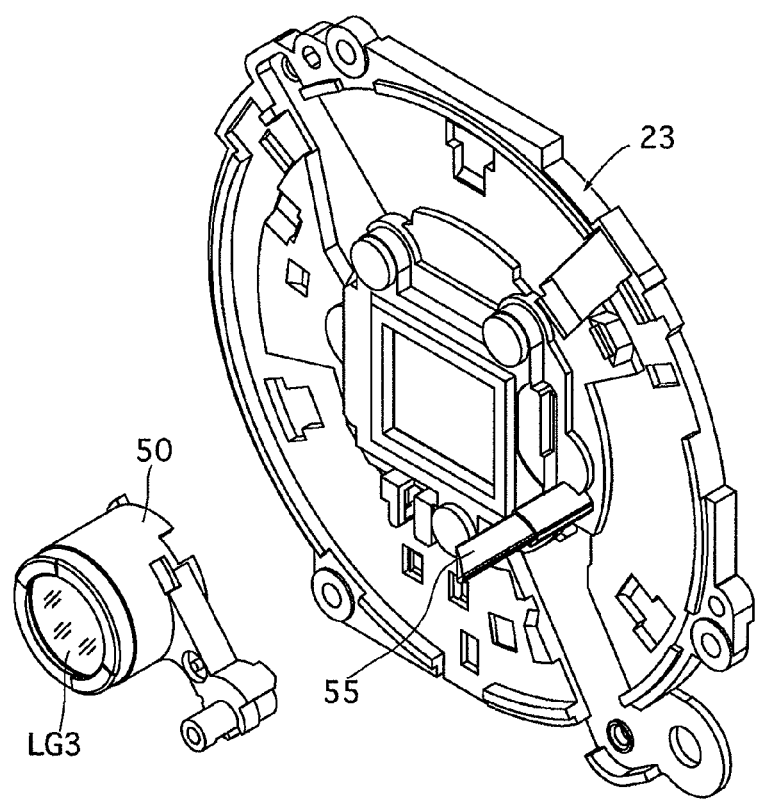
FIG. 27 is an exploded perspective view of the third-lens-group frame and a stationary CCD holder illustrating a third-lens-group-retracting cam-bar provided on the stationary CCD holder.

As shown in FIG. 26, the third-lens-group support ring 19 is provided with a second-lens-group-retracting cam-bar 54 which extends in a forward direction (i.e., toward the object side) parallel to the optical axis, and as shown in FIG. 27, the stationary CCD holder 23 is provided with a third-lens-group-retracting cam-bar 55 which extends in a forward direction (i.e., toward the object side) parallel the optical axis. Upon the second-lens-group support ring 20 and the third-lens-group support ring 19 mutually approaching each other from a predetermined distance onwards, the second-lens-group-retracting cam-bar 54, which is provided on the third-lens-group support ring 19, abuts against the radially-retractable frame 40 so that the radially-retractable frame 40 radially retracts (upward) while rotating from the photographable position to the radially-retracted position in accordance with a cam profile provided on the second-lens-group-retracting cam-bar 54. Similarly, upon the second-lens-group support ring 20 and the third-lens-group support ring 19 mutually approaching each other from a predetermined distance onwards, the third-lens-group-retracting cam-bar 55 which is provided on the stationary CCD holder 23 abuts against the third-lens-group frame 50, so that the third-lens-group frame 50 radially retracts (downward) while rotating from the photographable position to the radially-retracted position in accordance with a cam profile provided on the third-lens-group-retracting cam-bar 55.

The zoom lens barrel 11 having the above constructed is operated in the following described manner. In the accommodation state shown in FIG. 4, upon a main switch (not shown) being turned ON, the zoom motor is driven in a forward direction so that the zoom gear 31 rotates in a forward direction. In accordance with the rotation of the zoom gear 31, the helicoid ring 13 moves forward while rotating in accordance with the screw-engagement relationship between the female helicoid 27 of the stationary barrel 12 and the male helicoid 28 of the helicoid ring 13. Due to the engagement of the rotational-transfer recesses 13b with the rotational-transfer projections 14a, the first telescoping barrel 14, which is connected to the helicoid ring 13, moves forward while rotating together with the helicoid ring 13 while the outer radial protrusions 29 are guided by the female helicoid 27. The first linear guide ring 15 linearly moves forward together with the helicoid ring 13 and the first telescoping barrel 14. Furthermore, the cam ring 17, to which a rotational force from the first telescoping barrel 14 is given, also moves forward. The amount of forward movement of the cam ring 17 amounts to the total forward movement of the first linear guide ring 15 and the forward-telescoping amount achieved via the lead groove portion 15c-L of the guide through-slots 15c.

Figure 4:
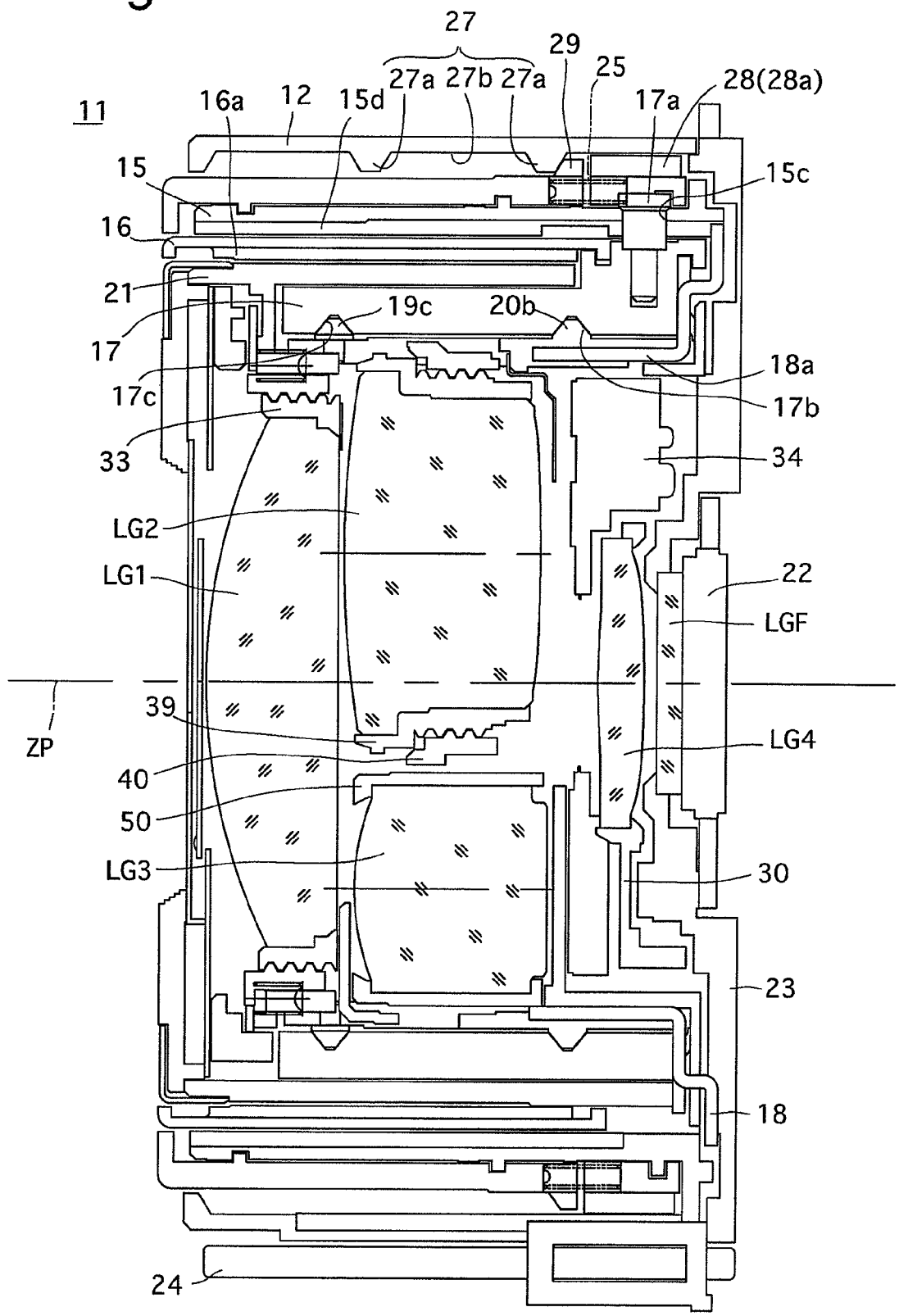
FIG. 4 is a longitudinal sectional view of the zoom lens barrel in an accommodation state, according to the present invention.
Figure 5:
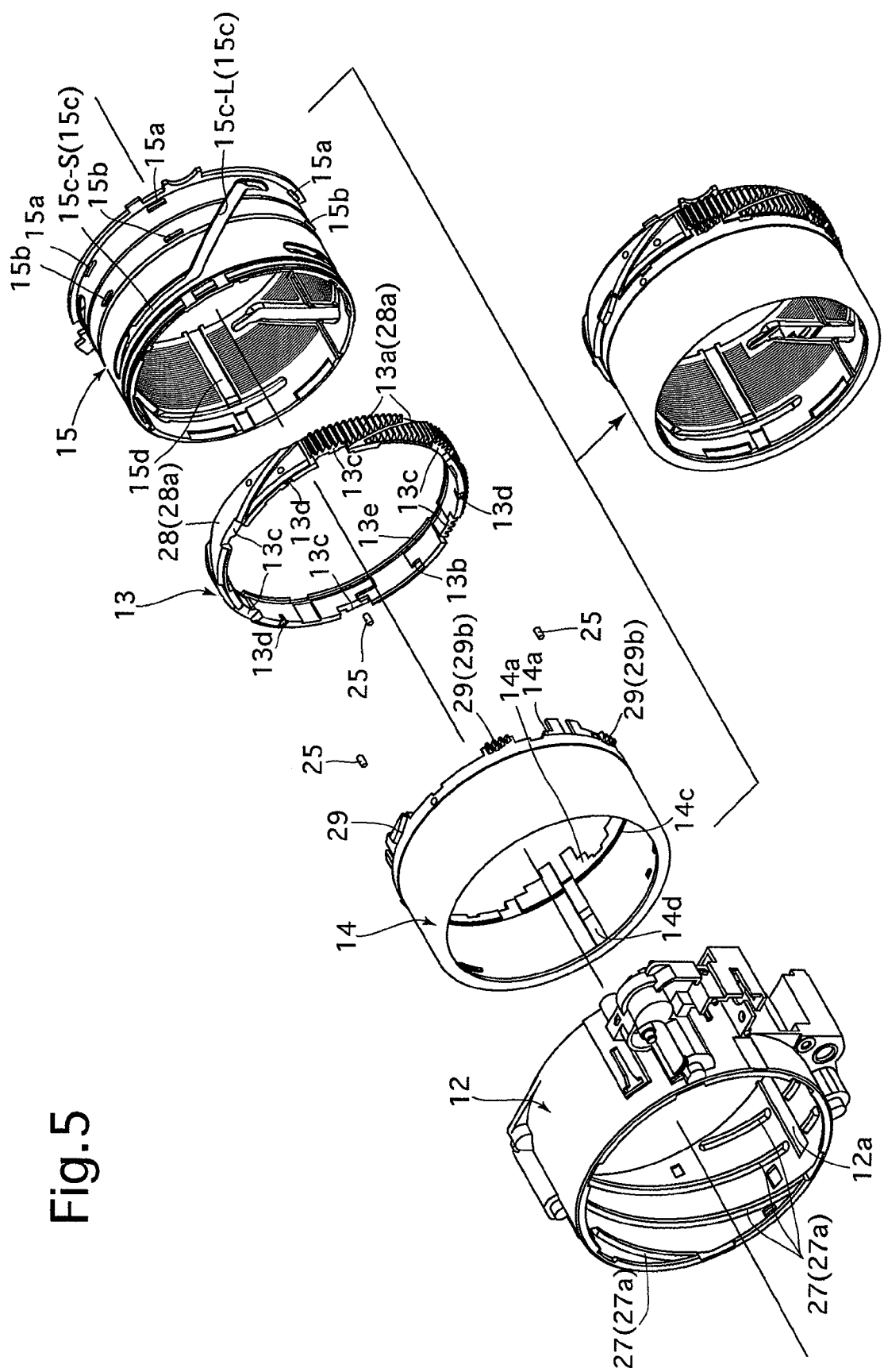
FIG. 5 is an exploded perspective view of a stationary barrel, a helicoid ring, a first telescoping barrel, and a first linear guide ring of the zoom lens barrel according to the present invention.

In the accommodation state of the zoom lens barrel 11 shown in FIG. 4, the radially-retractable frame 40 provided in the second-lens-group support ring 20 is held at the radially-retracted position above the photographing optical axis ZP via the cam function of the second-lens-group-retracting cam-bar 54 provided on the third-lens-group support ring 19, and the third-lens-group frame 50 provided in the third-lens-group support ring 19 is held at the radially-retracted position below the photographing optical axis ZP via the cam function of the third-lens-group-retracting cam-bar 55 provided on the stationary CCD holder 23. In this state, the second lens group LG2 and the third lens group LG3 are mutually positioned adjacent to each other on a common plane orthogonal to the photographing optical axis ZP. If the cam ring 17 is rotated by the forward-telescoping operation of the zoom lens barrel 11, the second-lens-group support ring 20 and the third-lens-group support ring 19, which are linearly guided inside the cam ring 17 via the second linear guide ring 18, respectively move in the optical axis direction in accordance with predetermined zoom paths via the engaging relationship between the first cam grooves 17b and the second-lens-group cam followers 20b, and the second cam grooves 17c and the third-lens-group cam followers 19c, respectively. Upon the zoom lens barrel 11 moving from the accommodation state to a forward-telescoping state, the second-lens-group support ring 20 and the third-lens-group support ring 19 mutually move apart from each other. As a result, the third-lens-group frame 50 moves away from the third-lens-group-retracting cam-bar 55 of the stationary CCD holder 23 at a mid-position during the forward-telescoping movement of the third-lens-group support ring 19 to a position in the zooming range, and the third lens group LG3 is swung (up) to the photographable position, so that the optical axis of the third lens group LG3 is coincident with the photographing optical axis ZP, via the aforementioned third-lens-group frame biasing springs (not shown). Furthermore, the radially-retractable frame 40 moves away from the second-lens-group-retracting cam-bar 54 of the third-lens-group support ring 19 at a mid-position during the forward-telescoping movement of the second-lens-group support ring 20 to a position in the zooming range, and the second lens group LG2 is swung (down) to the photographable position, so that the optical axis of the second lens group LG2 is coincident with the photographing optical axis ZP, via the aforementioned second-lens-group frame biasing springs (not shown). Thereafter, the third-lens-group frame 50 and the radially-retractable frame 40 are held at the photographable position until the zoom lens barrel 11 is moved (retracted) back to the accommodation state.

Furthermore, upon rotation of the cam ring 17, the first-lens-group support barrel 21, which is guided on the outer side of the cam ring 17 via the second telescoping barrel 16, moves in the optical axis direction in accordance with a predetermined zoom path via the engaging relationship of the outer cam grooves 17d of the cam ring 17 with the first-lens-group cam followers 21a of the first-lens-group support barrel 21.

In other words, the forward-telescoping position of the first lens group LG1 with respect to the imaging plane (light-receiving surface) of the CCD 22 is determined by the total value of the forward moving amount of the cam ring 17 with respect to the stationary barrel 12 and the forward-telescoping moving amount of the first-lens-group support barrel 21 with respect to the cam ring 17. Furthermore, the forward-telescoping position of the second lens group LG2 is determined by the total value of forward moving amount of the cam ring 17 with respect to the stationary barrel 12 and the forward-telescoping amount of the second-lens-group support ring 20 with respect to the cam ring 17. Similarly, the forward-telescoping position of the third lens group LG3 is determined by the total value of the forward moving amount of the cam ring 17 with respect to the stationary barrel 12 and the forward-telescoping amount of the third-lens-group support ring 19 with respect to the cam ring 17. Zooming is carried out by mutually changing the air-distances between the first lens group LG1, the second lens group LG2 and the third lens group LG3 while being moved along the photographing optical axis ZP.

Upon the zoom lens barrel 11 being moved in a forward telescoping direction from the accommodation state shown in FIG. 4, the zoom lens barrel 11 first moves to a wide-angle photographing position as shown in the top half of FIG. 3 and in FIG. 1. Thereafter, upon the zoom motor further driving the zoom lens barrel 11 in the forward telescoping direction, the focal length of the photographing optical system (first through fourth lens groups LG4) gradually increases to the long focal length side thereof, so as to finally reach the telephoto extremity (long focal length extremity) as shown in the bottom half of FIG. 3 and in FIG. 2. In the photographing range (zooming range) from the wide-angle extremity to the telephoto extremity, the helicoid ring 13 and the first telescoping barrel 14 move in the optical axis direction while rotating and being guided by the female helicoid 27 of the stationary barrel 12, likewise with when the zoom lens barrel 11 is telescoped forward from the accommodation state to the photographable state (i.e., the wide-angle extremity). During this telescoping movement, the followers 17a of the cam ring 17 transfer from the lead groove portion 15c-L of the guide through-slots 15c to the circumferential groove portion 15c-S of the guide through-slots 15c, so that the cam ring 17 does not move in the optical axis direction relative to the first linear guide ring 15. However, since the first linear guide ring 15 does move (forward) together with the helicoid ring 13 and the first telescoping barrel 14 in the optical axis direction, the cam ring 17 also moves in the optical axis direction relative to the stationary barrel 12 while rotating relative thereto.

When the zoom lens barrel 11 is in a photographable state in the range from the wide-angle extremity to the telephoto extremity, focusing is carried out by moving the fourth-lens-group frame 30 along the photographing optical axis ZP by driving an AF motor in accordance with object-distance data obtained from a distance measuring device (not shown).

If the main switch is turned OFF, the zoom motor is driven in a reverse direction so that the zoom lens barrel 11 moves toward the accommodation state by performing a rearward-telescoping operation in the reverse order of the forward-telescoping operation so as to arrive at the accommodation state shown in FIG. 4. At a mid-position during the rearward-telescoping movement toward the accommodation state, the third-lens-group frame 50 moves rearward together with the third-lens-group support ring 19 while swinging downward from the photographing position to the radially-retracted position via the cam function of the third-lens-group-retracting cam-bar 55 provided on the stationary CCD holder 23, and the radially-retractable frame 40 also moves rearward together with the second-lens-group support ring 20 while swinging upward from the photographing position to the radially-retracted position via the cam function of the second-lens-group-retracting cam-bar 54.

In the above-described zoom lens barrel 11, the helicoid ring 13 and the first telescoping barrel 14 are connected to each other so as to each be relatively rotatable with respect to the first linear guide ring 15 due to the engaging relationship of a rotational guide mechanism composed of the inner circumferential groove 13e and the outer projections 15a, the inner circumferential groove 14c and the outer projections 15b, and the circumferential groove 15e and the inner projections 14e. The inner circumferential groove 13e and the outer projections 15a, the inner circumferential groove 14c and the outer projections 15b, and the circumferential groove 15e and the inner projections 14e are loosely engaged with each other so that the helicoid ring 13 and the first telescoping barrel 14 are movable in the optical axis direction relative to the first linear guide ring 15 by a slight amount. In other words, the helicoid ring 13 and the first telescoping barrel 14 are restricted from separating in the optical axis direction via the first linear guide ring 15, however, a slight amount of relative movement therebetween in the optical axis direction is possible.

When the helicoid ring 13 and the first telescoping barrel 14 are connected to the first linear guide ring 15 so as to be relatively rotatable thereto, the compression coil springs 25 are held in a compressed state between opposing edge faces of the helicoid ring 13 and the first telescoping barrel 14. As mentioned above, the compression coil springs 25 are in a compressed state so as to bias the first telescoping barrel 14 forwards and the helicoid ring 13 rearwards.

Figure 13:
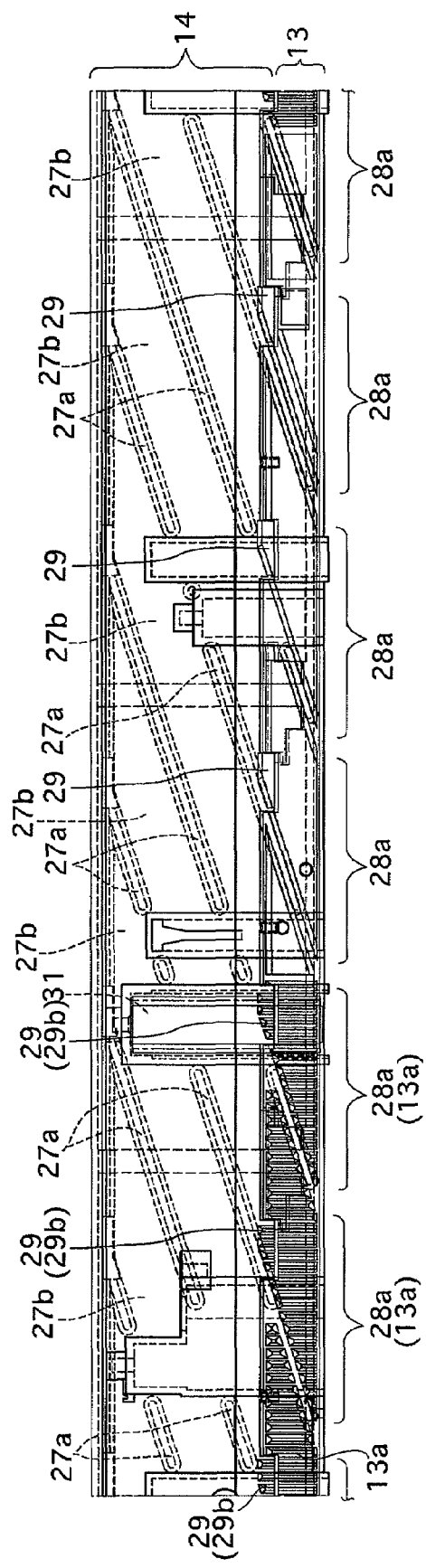
FIG. 13 is a developed view of the zoom lens barrel in an accommodation state, showing the relationship between the stationary barrel, the helicoid ring, and the first telescoping barrel, which are shown partially transparent for clarity purposes.
Figure 14:
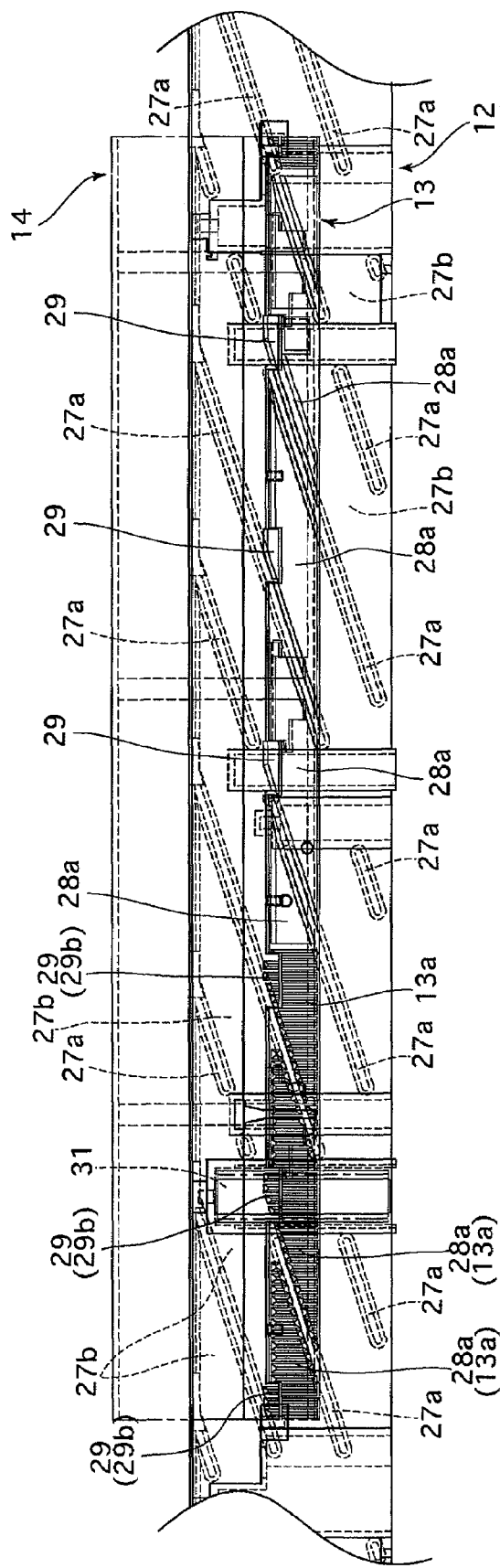
FIG. 14 is a developed view of the zoom lens barrel in a photographable state at the wide-angle extremity, showing the relationship between the stationary barrel, the helicoid ring, and the first telescoping barrel, which are shown partially transparent for clarity purposes.
Figure 15:
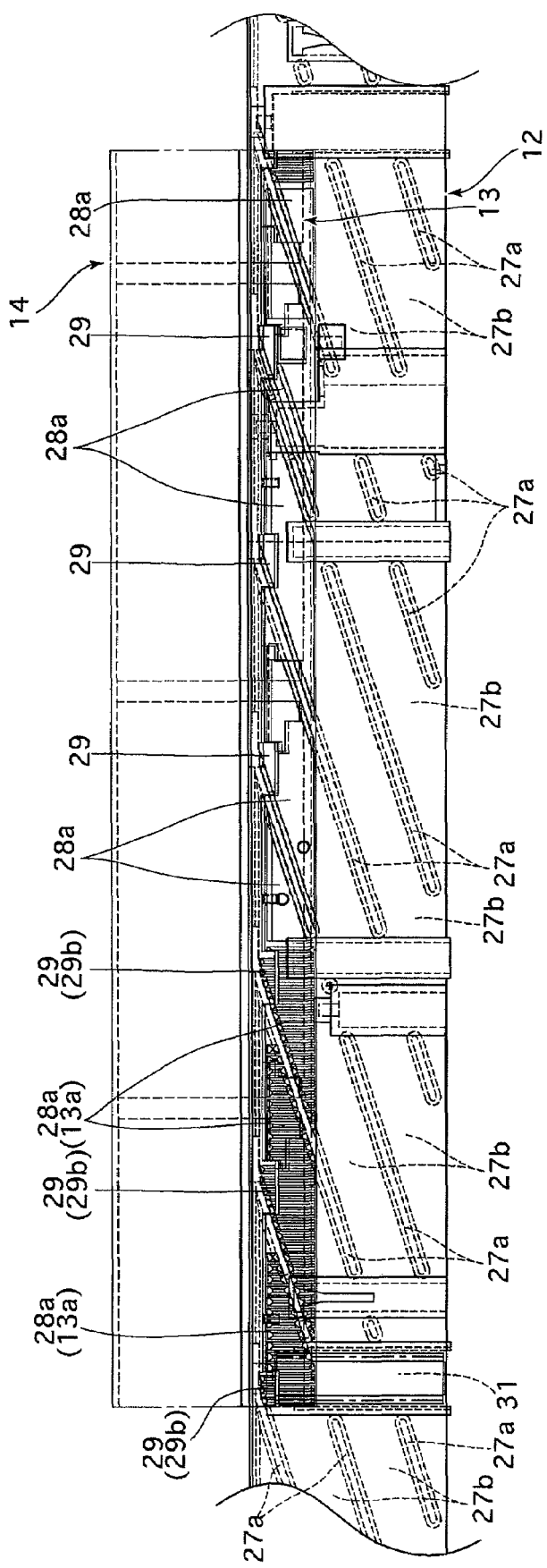
FIG. 15 is a developed view of the zoom lens barrel in a photographable state at the telephoto extremity, showing the relationship between the stationary barrel, the helicoid ring, and the first telescoping barrel, which are shown partially transparent for clarity purposes.
Figure 16:
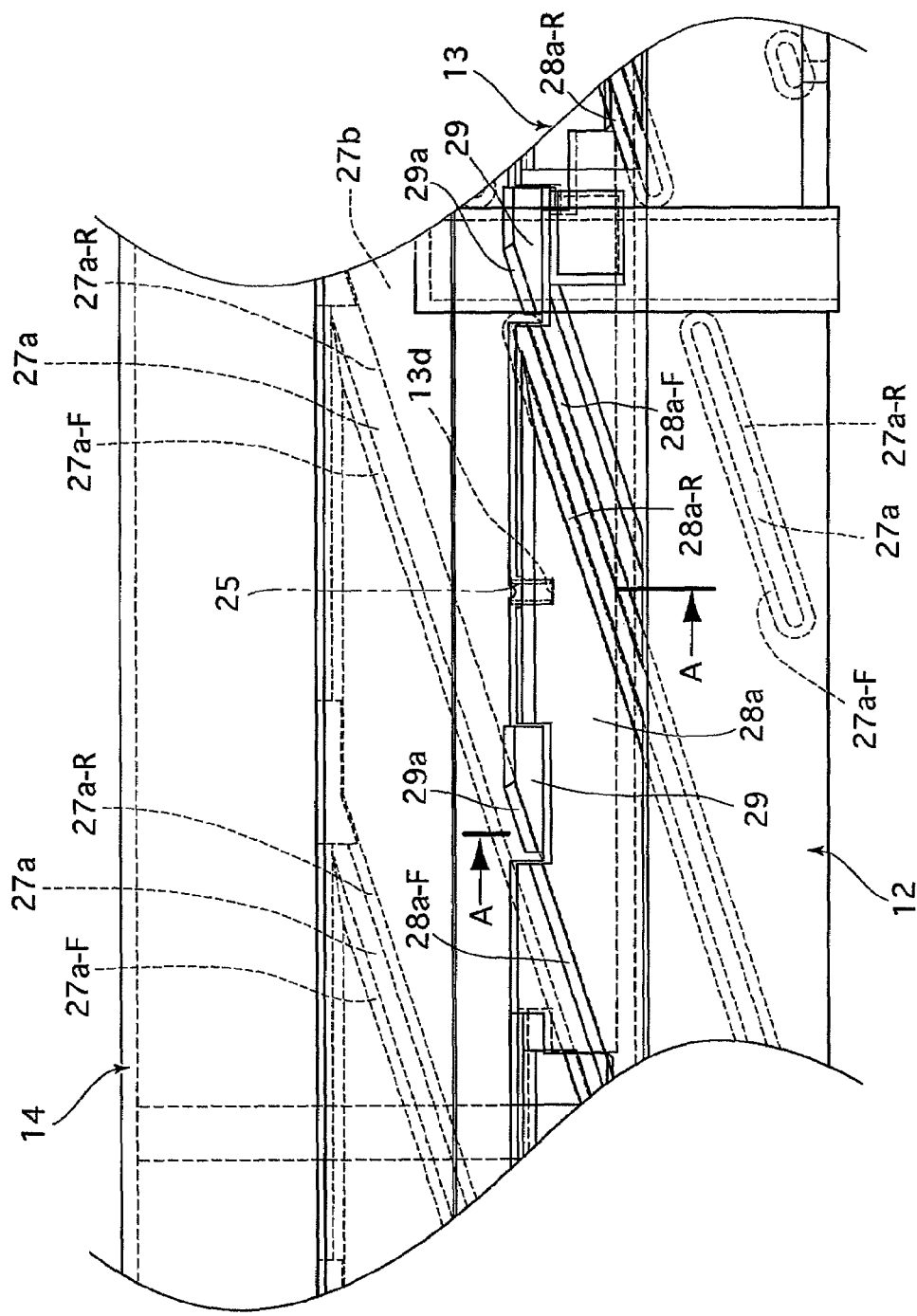
FIG. 16 shows an enlarged developed view of the area showing the engagement of a female helicoid with a male helicoid shown in FIG. 14, of the zoom lens barrel according to the present invention.

FIGS. 13 through 15 show operation states of the helicoid ring 13 and the first telescoping barrel 14 with respect to the stationary barrel 12. FIG. 13 shows the accommodation state, FIG. 14 shows the wide-angle extremity photographable state, and FIG. 15 shows the telephoto extremity photographable state, of the helicoid ring 13 and the first telescoping barrel 14. As can be understood from FIGS. 13 through 15, during the entire moving range from the accommodation state to the wide-angle extremity photographable state and to the telephoto extremity photographable state, the helicoid ring 13 relatively rotates while moving in the optical axis direction in accordance with the engaging relationship between the male helicoid 28 and the female helicoid 27. Furthermore, as shown in FIGS. 16 and 17, when the male helicoid 28 of the helicoid ring 13 is engaged with the female helicoid 27 of the stationary barrel 12, the outer radial protrusions 29 provided on the first telescoping barrel 14 also are in sliding contact (engaged) with the lead threads 27a of the female helicoid 27, and the first telescoping barrel 14 rotates together with the helicoid ring 13 while moving in the optical axis direction. When either the helicoid ring 13 or the first telescoping barrel 14 are at the stopped position thereof, the front lead surfaces 27a-F of the lead threads 27a which constitute the female helicoid 27 press against the rear lead surfaces 28a-R of the helicoid threads 28a which constitute the male helicoid 28 of the helicoid ring 13, and the rear lead surface 27a-R of the lead threads 27a press against the sub-lead surfaces 29a of the outer radial protrusions 29 of the first telescoping barrel 14 (see FIGS. 16 and 17). According to this construction, a helicoid thread 28a and a outer radial protrusion 29 are pressed in opposite directions against each opposing pair of lead threads 27a, so that the helicoid ring 13 and the first telescoping barrel 14 can remain stable with respect to the stationary barrel 12 throughout the entire moving range from the accommodation state to the wide-angle extremity photographable state, and to the telephoto extremity photographable state.

According to the above description, the zoom lens barrel 11 of the present invention separates a telescoping member into the helicoid ring 13 and the first telescoping barrel 14, which linearly move while rotating and are slightly movable relative to each other in the optical axis direction, the helicoid ring 13 and the first telescoping barrel 14 are biased in opposite directions away from each other via the compression coil springs 25, and backlash in the optical axis direction of the telescoping member (13 and 14) with respect to the stationary barrel 12 is removed by pressing the male helicoid 28 (rear lead surfaces 28a-R of the helicoid threads 28a) of the helicoid ring 13 against the front lead surfaces 27a-F of the female helicoid 27 (lead threads 27a) and pressing the outer radial protrusions 29 (sub-lead surfaces 29a) of the first telescoping barrel 14 against the rear lead surface 27a-R of the female helicoid 27 (lead threads 27a). The lead threads 27a, the helicoid threads 28a, and the outer radial protrusions 29 constitute a helicoid mechanism which causes the helicoid ring 13 and the first telescoping barrel 14 to move in a linear direction (in the optical axis direction) while rotating. By utilizing this helicoid mechanism for carrying out backlash removal, a backlash removal device (helicoid mechanism) can be provided from a simple structure having a reduced number of components. In particular, this backlash removal device is very space efficient due to the outer radial protrusions 29 on the first telescoping barrel 14 being formed as small sub-helicoid protrusions and are incorporated into portions of the helicoid threads 28a of the helicoid ring 13.

Furthermore, since the compression coil springs 25 are held in between the helicoid ring 13 and the first telescoping barrel 14 which always integrally rotate with each other, provision for special space for mounting a biasing device for backlash removal in the vicinity of the stationary barrel 12 is not necessary.

As mentioned above, surfaces of three out of the six helicoid threads 28a constituting the male helicoid 28 are provided with the circumferential gear 13a which meshes with the zoom gear 31. Furthermore, surfaces of three out of the six outer radial protrusions 29 of the first telescoping barrel 14 are provided with gear portions 29b. As shown in FIGS. 13 through 15, in a state where the helicoid ring 13 and the first telescoping barrel 14 are connected with each other, the three outer radial protrusions 29 which have the gear portions 29b are combined with the three helicoid threads 28a which have the circumferential gear 13a, and the remaining three outer radial protrusions 29 which do not have the gear portions 29b are combined with the remaining three helicoid threads 28a which do not have the circumferential gear 13a. Furthermore, as shown in FIGS. 13, 14, 18 and 20, when the zoom gear 31 is in mesh with the circumferential gear 13a provided on the helicoid threads 28a, the gear portions 29b provided on the outer radial protrusions 29 mesh with the zoom gear 31 in a similar manner as that of the circumferential gear 13a. Hence, by forming the gear portions 29b on the outer radial protrusions 29, the outer radial protrusions 29 can be prevented from interfering with the zoom gear 31.

Unlike in the case of the present invention, if none of the outer radial protrusions 29 had any of the gear portions 29b formed thereon, the outer radial protrusions 29 and the zoom gear 31 would mutually interfere with each other at a coinciding position. In order to avoid this problem, it is conceivable to reduce the length of the zoom gear 31, provide the zoom gear 31 at a position deviated from that of the outer radial protrusions 29 in the circumferential direction and/or in the optical axis direction, or cut off the outer radial protrusions 29 which interfere with the zoom gear 31. However, if the length of the zoom gear 31 is shortened, the amount of meshing between the zoom gear 31 and the circumferential gear 13a would be restricted (reduced), and there is a chance that mechanical problems would occur such as deterioration of the strength and precision of the meshing therebetween. Furthermore, in the case where the zoom gear 31 is provided at a predetermined position so as not to coincide (interfere) with the outer radial protrusions 29, there is a chance that the design freedom would be restricted, and/or that the mechanism including the helicoid ring 13, the first telescoping barrel 14 and the zoom gear 31, would have to be enlarged. Furthermore, if the outer radial protrusions 29 which coincide with the positions of the zoom gear 31 were cut off, there is a chance that the interconnecting strength and support balance of the first telescoping barrel 14 with respect to the stationary barrel 12 is deteriorated. However, according to the construction of the present invention in which the gear portions 29b are formed on (three of) the outer radial protrusions 29, no special manufacturing process is necessary for the zoom gear 31, and interference of the outer radial protrusions 29 with the zoom gear 31 can be prevented without reducing the number of outer radial protrusions 29.

Figure 21:
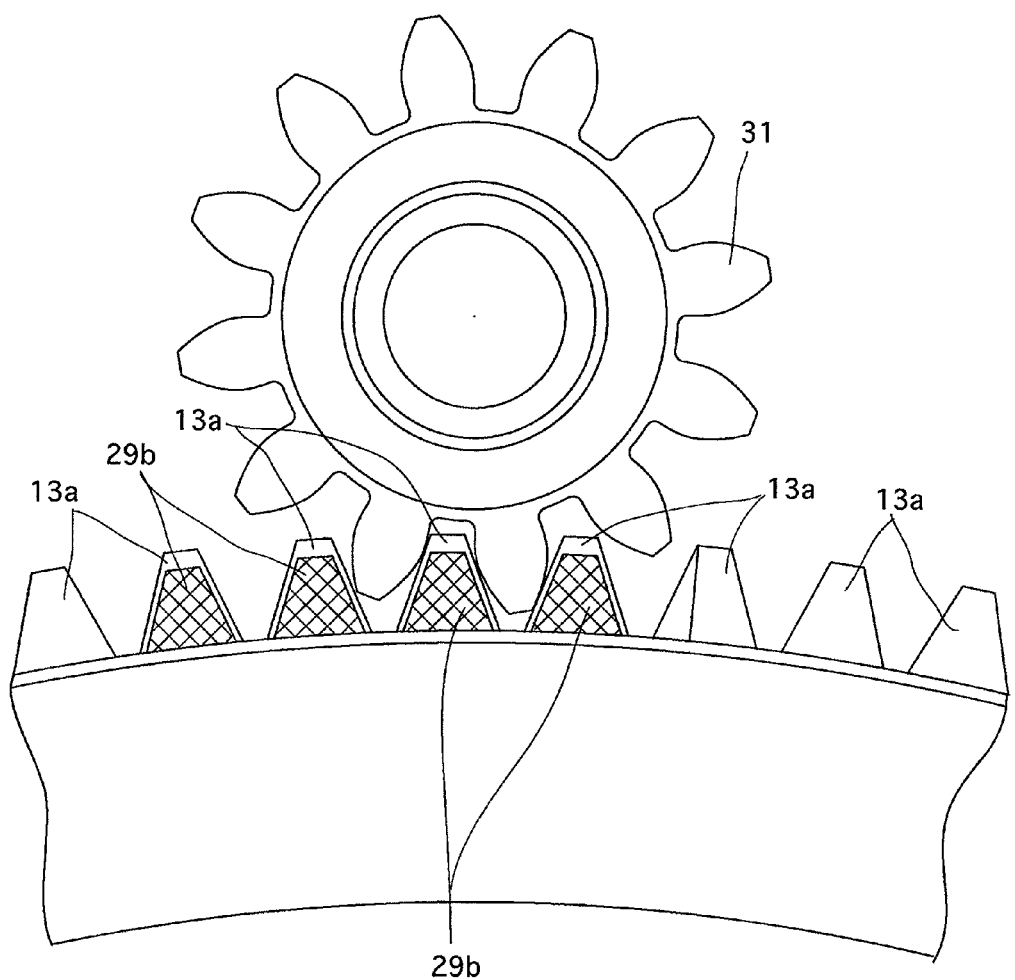
FIG. 21 is a front elevational view showing an enlarged portion of the zoom gear, and the surrounding area, shown in FIG. 20.

Note that, as shown in FIG. 21, the plurality of gear teeth which constitute the gear portions 29b formed on the outer radial protrusions 29 of the first telescoping barrel 14, and the plurality of gear teeth which constitute the circumferential gear 13a of the helicoid ring 13 mutually have substantially the same gear pitch (circumferential distances between gear-tooth centers). However, the radial height and the circumferential width of each trapezoidal shaped gear tooth constituting the gear portions 29b are each formed smaller than the radial height and the circumferential width of each trapezoidal shaped gear tooth constituting the circumferential gear 13a. Accordingly, in a state where the zoom gear 31 is in mesh with the circumferential gear 13a, the gear portions 29b is in effect not engaged (meshed) with the zoom gear 31. This construction has the following advantages.

Gears which are utilized in high-precision instruments such as the zoom lens barrel 11 demand high meshing precision. In particular, in the present invention, two gear portions, i.e., the circumferential gear 13a and the gear portions 29b, coincide with the zoom gear 31, and if both of the circumferential gear 13a and the gear portions 29b were to try and mesh with the zoom gear 31, an extremity high precision would be demanded for not only the gears (13a, 29b and 31) themselves, but also for the relative positional relationship between the helicoid ring 13 and the first telescoping barrel 14, so that manufacture and adjustment would be very difficult. However, in the present invention, since the gear teeth of the gear portions 29b are made smaller (lower) than the gear teeth of the circumferential gear 13a, and the zoom gear 31 and the gear portions 29b do not in effect mesh with each other, interference of the circumferential gear 13a and the gear portions 29b with the zoom gear 31 does not occur, and the positional settings of the helicoid ring 13 and the first telescoping barrel 14 can be easily carried out. As a result, productivity is improved, and occurrence of mechanical trouble can be reduced.

Figure 28:
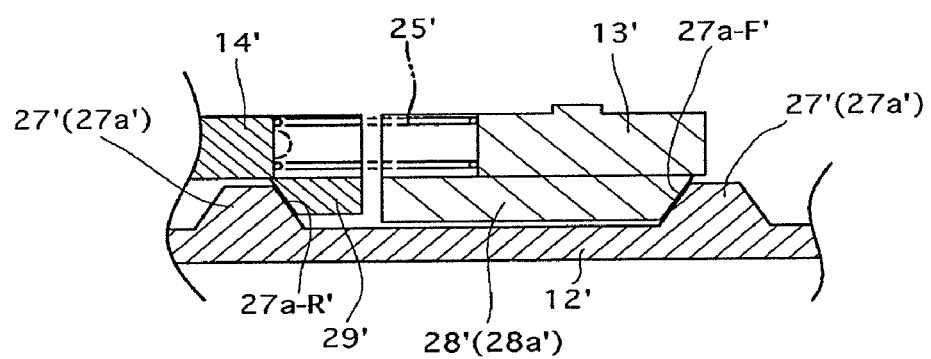
FIG. 28 shows a sectional view of a portion of the helicoid mechanism according to another embodiment of the zoom lens barrel 11, of the present invention.

FIG. 28 shows a sectional view of a portion of the helicoid mechanism according to another embodiment of the zoom lens barrel 11, of the present invention. In this embodiment shown in FIG. 28, conversely to the first embodiment, a male helicoid 27' (helicoid threads 27a') is formed on the outer circumferential surface of the stationary barrel (helicoid ring) 12'. A helicoid ring 13' and a first telescoping barrel 14' are relatively movable to each other in the optical axis direction and are biased in mutually opposite directions away from each other by the compression coil springs 25'. Due to this biasing force, helicoid threads 28a' of a male helicoid 28' formed on the inner circumferential surface of the helicoid ring 13' press against front lead surfaces (first guide surface) 27a-F' of the helicoid threads 27a', and inner radial protrusions (second slide-engaging portions/sub-helicoid projections) 29' provided on the inner circumferential surface of the first telescoping barrel 14' press against rear lead surfaces (second guide surface) 27a-R' of the helicoid threads 27a'. A similar result as that of the first embodiment can be achieved with the construction shown in FIG. 28.

Although the present invention has been described with reference to a specific embodiment and drawings, the present invention is not limited thereto. For example, in the illustrated embodiment and drawings, the lead threads 27a, the helicoid threads 28a, and the outer radial protrusions 29, which are used for backlash removal between the helicoid ring 13 and the first telescoping barrel 14, are respectively provided in numbers of six; however, a number thereof other than six is possible. Furthermore, the biasing device for backlash removal is not limited to the three compression coil springs 25 in the illustrated embodiment.

Furthermore, although in the illustrated embodiment and drawings the stationary barrel 12 which is provided with the female helicoid 27 is a stationary member, the present invention can be applied to a case wherein the stationary barrel 12 is replaced with a helicoid ring that is movable in the optical axis direction.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens barrel which accommodates a lens system, comprising:
    a helicoid ring provided with a helicoid on one of an inner and outer circumferential surface thereof;
    a retractable rotational ring which is guided by said helicoid of said helicoid ring to move along an optical axis of said lens system while rotating, wherein said retractable rotational ring includes a pair of split retractable rotational rings which are supported so as to integrally rotate and to be relatively movable in said optical axis direction with respect to each other;
    a first slide-engaging portion and a second slide-engaging portion provided on one and the other of said pair of split retractable rotational rings, wherein said first and second slide-engaging portions are slidably engaged with said helicoid of said helicoid ring; and
    a biasing device which biases said pair of split retractable rotational rings in opposite directions in said optical axis direction so that said first and second slide-engaging portions are pressed in opposite directions against an opposing pair of first and second guide surfaces, respectively, of said helicoid of said helicoid ring.

2. The lens barrel according to claim 1, wherein said first slide-engaging portion comprises helicoid threads which screw-engage with said helicoid of said helicoid ring, and said second slide-engaging portion comprises sub-helicoid projections which are smaller than said helicoid threads.

3. The lens barrel according to claim 2, wherein recesses are formed on end portions of one of said split retractable rotational rings on which said helicoid threads are provided so as to cut-out portions of said helicoid threads, wherein said recesses each accommodate respective sub-helicoid projections provided on the other of said split retractable rotational rings.

4. The lens barrel according to claim 2, further comprising a drive gear which transmits a rotational force to said retractable rotational ring so as to rotate said retractable rotational ring,
    wherein a circumferential gear formed on said helicoid threads meshes with said drive gear, and
    wherein a gear portion is formed on each of said sub-helicoid projections, wherein said gear portion does not interfere with said drive gear.

5. The lens barrel according to claim 4, wherein teeth of said gear portion are formed smaller than teeth of said circumferential gear.

6. The lens barrel according to claim 5, wherein radial heights and circumferential widths of said teeth of said gear portion are smaller than radial heights and circumferential widths of said teeth of said circumferential gear.

7. The lens barrel according to claim 1, wherein said helicoid is formed on said inner circumferential surface of said helicoid ring, and
    wherein said first and second slide-engaging portions are provided on outer circumferential surfaces of said one and the other of said pair of split retractable rotational rings.

8. The lens barrel according to claim 1, wherein said helicoid is formed on said outer circumferential surface of said helicoid ring, and
    wherein said first and second slide-engaging portions are provided on inner circumferential surfaces of said one and the other of said pair of split retractable rotational rings.

9. The lens barrel according to claim 1, wherein said biasing device comprises at least one compression coil spring provided between opposing end surfaces of said pair of split retractable rotational rings.

10. The lens barrel according to claim 1, further comprising a linear ring supported within said pair of retractable rotational rings to be movable in said optical axis direction,
    wherein said pair of split retractable rotational rings are respectively connected to said linear ring via a rotational guide mechanism which allows said pair of split retractable rotational rings to rotate relative to said linear ring, and allows movement in the optical axis direction to be transferred between said pair of split retractable rotational rings and said linear ring, and
    wherein said rotational guide mechanism allows a small amount of relative movement of said split retractable rotational rings in said optical axis direction.

11. The lens barrel according to claim 1, wherein said lens system comprises at least two movable lens groups which are relatively movable along said optical axis via rotation of said pair of split retractable rotational rings.

* * * * *